(12) United States Patent  
Newman

(10) Patent No.: US 9,420,884 B2  
(45) Date of Patent: Aug. 23, 2016

(54) OVERHEAD STORAGE RACK

(71) Applicant: JAK HOLDINGS, LLC, Rexburg, ID (US)

(72) Inventor: Jared J. Newman, Pocatello, ID (US)

(73) Assignee: JAK HOLDINGS, LLC, Rexburg, ID (US)

( * ) Notice: Subject to any disclaimer, the term of this patent is extended or adjusted under 35 U.S.C. 154(b) by 0 days.

(21) Appl. No.: 14/594,964

(22) Filed: Jan. 12, 2015

(65) Prior Publication Data

US 2016/0198843 A1   Jul. 14, 2016

(51) Int. Cl.
*A47B 5/00* (2006.01)
*A47B 55/02* (2006.01)
*A47B 57/48* (2006.01)
*F16M 13/02* (2006.01)

(52) U.S. Cl.
CPC ................ *A47B 55/02* (2013.01); *A47B 57/48* (2013.01); *F16M 13/027* (2013.01); *A47B 2005/003* (2013.01)

(58) Field of Classification Search
CPC ........... A47B 2005/003; A47B 43/003; A47B 55/02; A47B 57/48
USPC ............. 52/239; 108/149; 211/113, 117, 118; 248/317, 327, 333
See application file for complete search history.

(56) References Cited

U.S. PATENT DOCUMENTS

| 3,495,796 | A | * | 2/1970 | Friedrich | E04B 9/20 248/327 |
|---|---|---|---|---|---|
| 3,912,407 | A | * | 10/1975 | Heininger | F16B 7/00 403/205 |
| 5,118,066 | A | * | 6/1992 | Perrault | H02G 3/263 248/333 |
| 6,357,609 | B1 | * | 3/2002 | Van Noord | A47B 45/00 108/65 |
| 6,435,105 | B1 | * | 8/2002 | Mikich | A47B 43/003 108/42 |
| 7,228,669 | B1 | * | 6/2007 | Yaraschefski | A47B 5/00 108/144.11 |
| 7,421,957 | B2 | * | 9/2008 | Baez | E04H 6/42 108/149 |
| 8,245,651 | B1 | * | 8/2012 | Mikich | A47B 5/00 108/42 |
| 8,371,458 | B2 | * | 2/2013 | Yu | A47B 43/006 108/149 |
| 8,511,486 | B2 | * | 8/2013 | Mansor | A47B 43/00 211/117 |
| 8,651,294 | B2 | * | 2/2014 | Mansor | A47B 43/003 108/42 |
| 2004/0182291 | A1 | * | 9/2004 | Mikich | A47B 5/00 108/149 |
| 2006/0070967 | A1 | * | 4/2006 | Schaubeck | A47B 43/003 211/187 |
| 2006/0091087 | A1 | * | 5/2006 | Belanger | A47B 61/04 211/37 |
| 2007/0205169 | A1 | * | 9/2007 | Fratilla | A47B 47/02 211/117 |
| 2007/0251897 | A1 | * | 11/2007 | Chang | B42F 15/0094 211/46 |
| 2009/0278004 | A1 | * | 11/2009 | Eustace | A47F 5/0892 248/201 |
| 2012/0037581 | A1 | * | 2/2012 | Anderson | A47F 7/22 211/85.3 |
| 2012/0103923 | A1 | * | 5/2012 | Mansor | A47B 43/003 211/118 |

* cited by examiner

*Primary Examiner* — Michael Safavi
(74) *Attorney, Agent, or Firm* — Davis Wright Tremaine LLP; George C. Rondeau, Jr.; Heather M. Colburn

(57) ABSTRACT

A storage rack including a platform and a plurality of upright support assemblies configured to mount the platform to one or more support structures located above the platform. The platform includes a peripheral frame with a plurality of corners. The support assemblies are mounted to the peripheral frame at other than the corners and extend upwardly from the platform. The platform may include a plurality of cross braces extending from a first side of the peripheral frame to a second side of the peripheral frame, and a plurality of poles supported by and extending transverse to the cross braces.

24 Claims, 22 Drawing Sheets

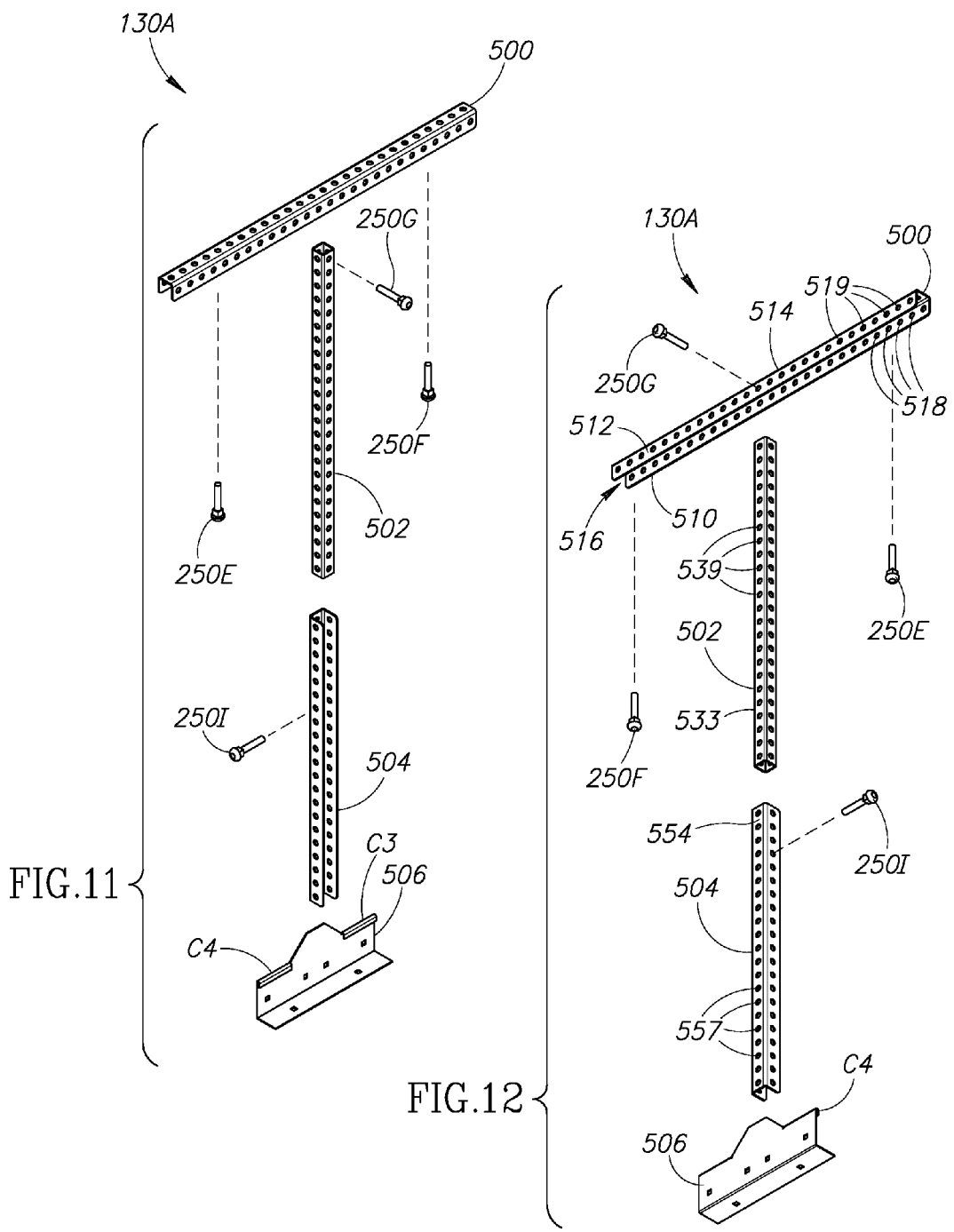

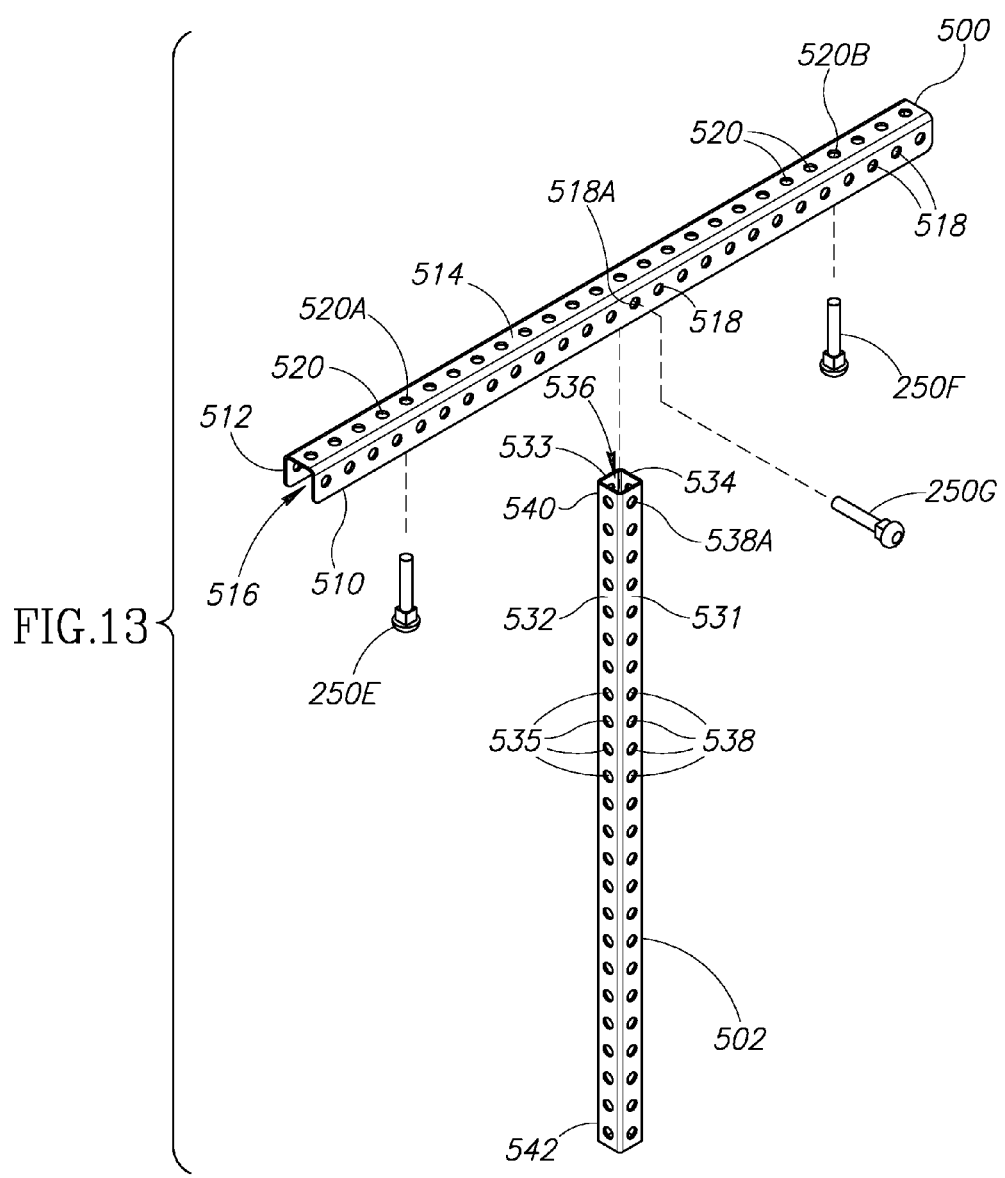

OVERHEAD STORAGE RACK

BACKGROUND OF THE INVENTION

1. Field of the Invention

The present invention is directed generally to storage shelves and racks.

2. Description of the Related Art

Shelves and racks that hang downwardly (e.g., from the ceiling) are used in many commercial and consumer applications. Unfortunately, many conventional shelves or racks have structural problems. For example, many hanging storage racks have supports located in positions that make placing items on the rank difficult or cause items to wedge in between supports. Further, some hanging racks swing in an undesirable and potentially dangerous manner when items are placed on the rack. Therefore, a need exists for new storage racks that avoid one or more of these problems. Further, storage racks configured to be disassembled into component parts that fit within packaging having smaller dimensions are particularly desirable. The present application provides these and other advantages as will be apparent from the following detailed description and accompanying figures.

BRIEF DESCRIPTION OF THE SEVERAL VIEWS OF THE DRAWING(S)

FIG. 11 is an enlarged exploded perspective view of a support assembly of the storage rack of FIG. 1B.

FIG. 12 is a second enlarged exploded perspective view of a support assembly of the storage rack of FIG. 1B.

FIG. 13 is a first enlarged portion of FIG. 11.

Like reference numerals have been used in the figures to identify like components.

DETAILED DESCRIPTION OF THE INVENTION

Figure 1A:
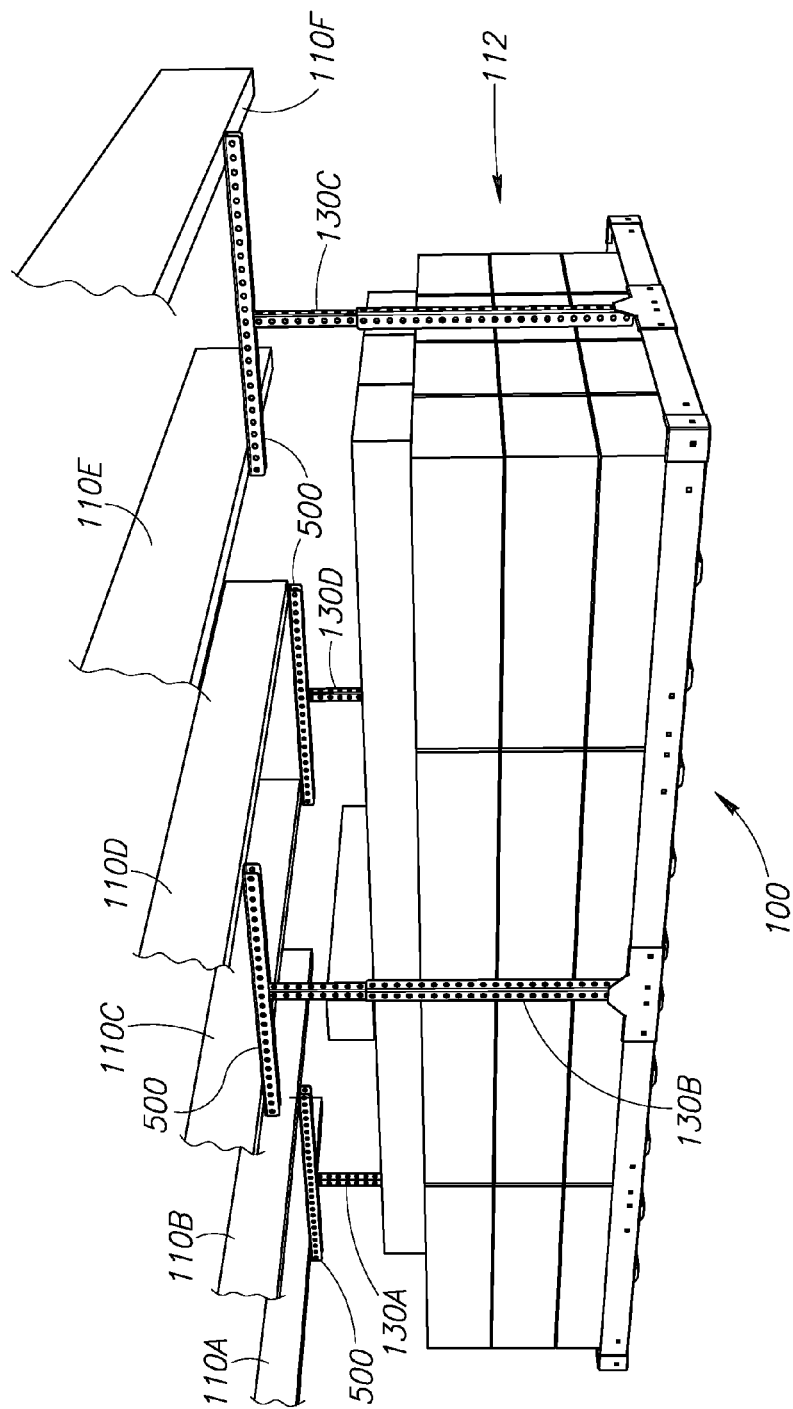
FIG. 1A is a perspective view of a storage rack mounted to six ceiling trusses and storing a plurality of items.
Figure 1B:
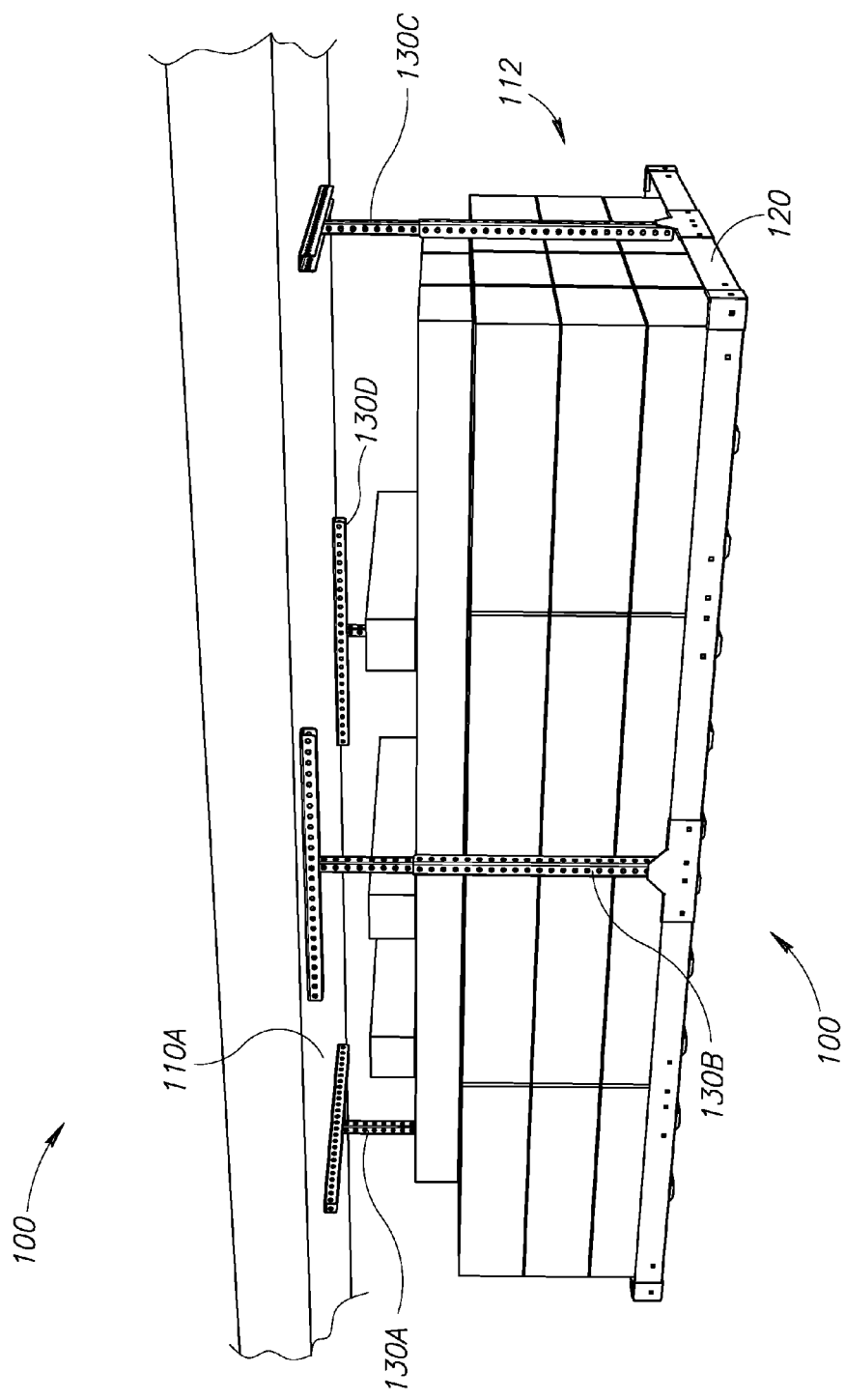
FIG. 1B is a perspective view of the storage rack mounted to a ceiling.

FIGS. 1A-1B are perspective views of a hanging shelf or storage rack 100 configured to be mounted to an underside of one or more support structures 110A-110F (e.g., a ceiling, ceiling support beams, floor joist, a frame of rack system, etc.) and to hang downwardly therefrom. The storage rack 100 may be installed and hang overhead. The storage rack 100 is configured to store one or more items 112.

In FIG. 1A, the storage rack 100 is depicted hanging from the six support structures 110A-110F (e.g., ceiling trusses). On the other hand, in FIG. 1B, the storage rack 100 is depicted hanging from the single support structure 110A (e.g., a ceiling).

Figure 2:
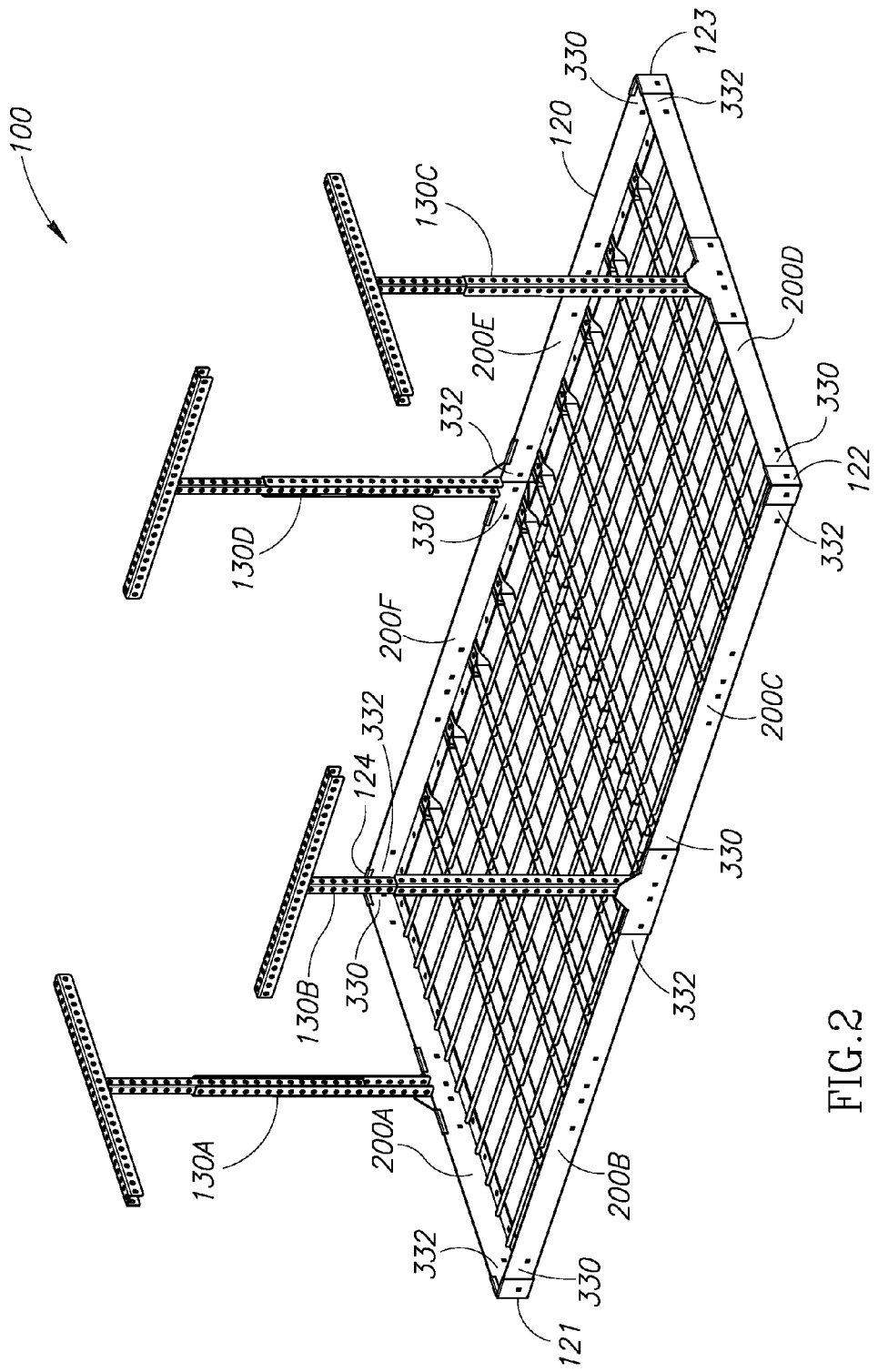
FIG. 2 is a perspective view of the storage rack of FIG. 1B.

Referring to FIG. 2, the storage rack 100 includes a platform assembly 120 suspended from one or more of the support structures 110A-110F (see FIG. 1A) by a plurality of support assemblies 130A-130D.

Platform Assembly

Referring to FIG. 2, the platform assembly 120 may be substantially flat with a square or rectangular outer shape. In the embodiment illustrated, the platform assembly 120 has four corners 121-124.

Figure 3:
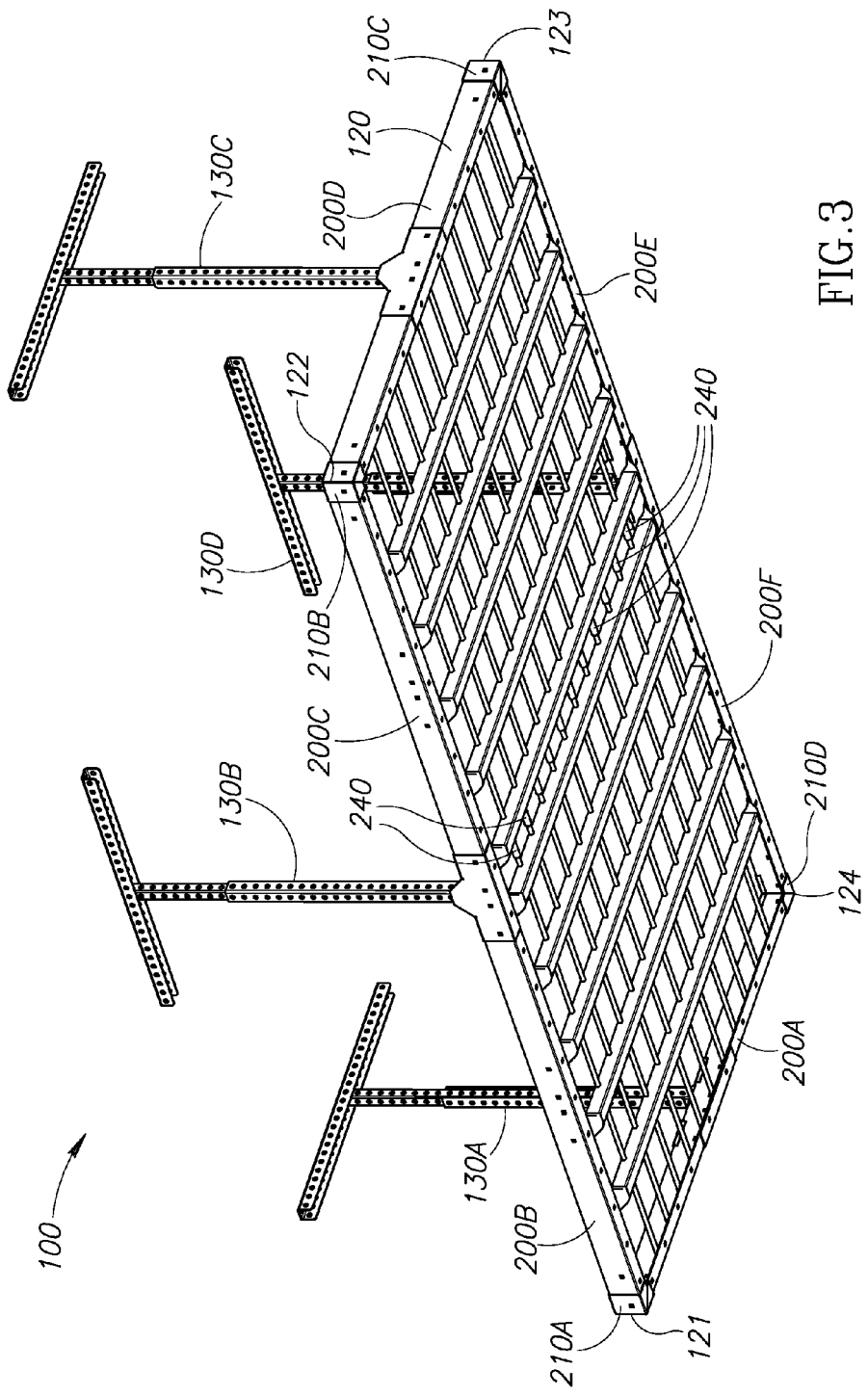
FIG. 3 is a perspective view of the underside of the storage rack of FIG. 1B.
Figure 4:
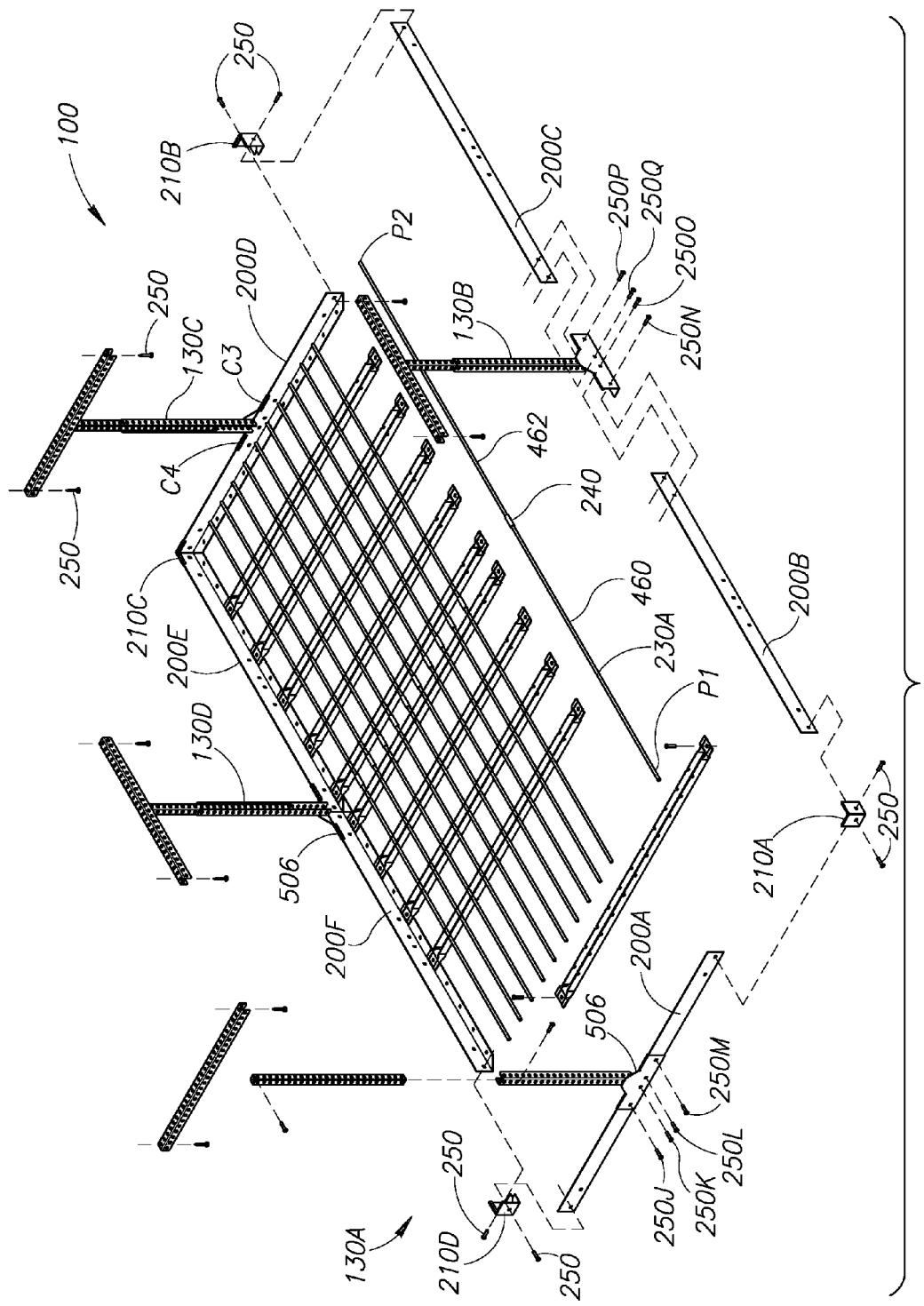
FIG. 4 is a partially exploded perspective view of the storage rack of FIG. 1B.
Figure 5:
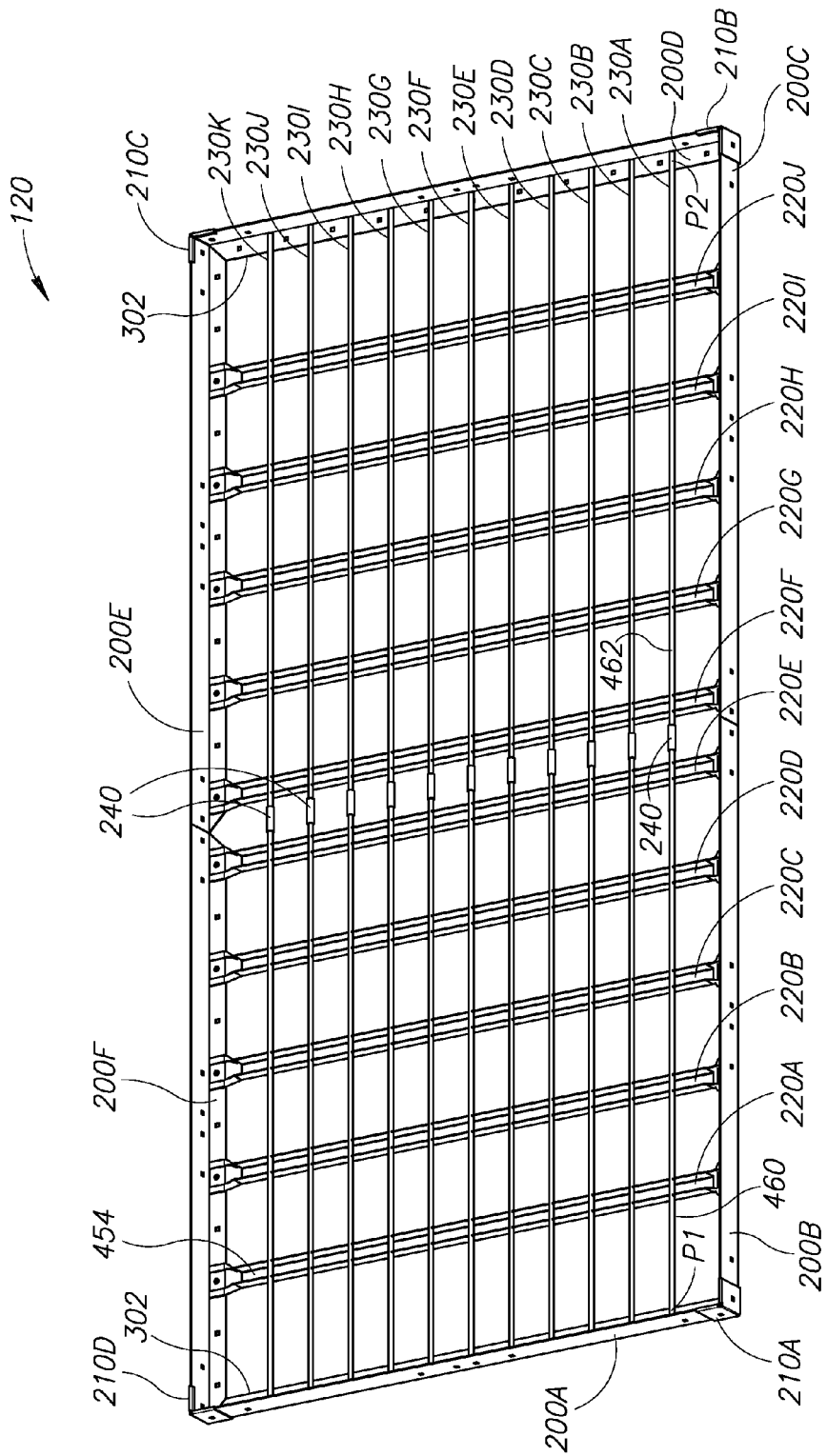
FIG. 5 is a perspective view of a platform assembly of the storage rack of FIG. 1B.

Referring to FIG. 5, the platform assembly 120 includes a plurality of peripheral frame members 200A-200F, a plurality of corner braces 210A-210D, a plurality of cross braces 220A-220J, a plurality of rods or poles 230A-230K, an optional plurality of tube-shaped pole couplers 240 (see also FIG. 3), and an optional plurality of fasteners 250 (see FIG. 4). Referring to FIG. 4, the optional fasteners 250 may include bolts, screws, rivets, combinations thereof, and the like. In the embodiment illustrated, the optional fasteners 250 are substantially identical to one another. However, this is not a requirement. In alternative embodiments, other means such as adhesives, welds, and the like may be used with or instead of the fasteners 250.

Referring to FIG. 5, in the embodiment illustrated, the platform assembly 120 includes the six peripheral frame members 200A-200F, which are substantially identical to one another. For the sake of brevity, only the peripheral frame member 200A will be described in detail.

Figure 6:
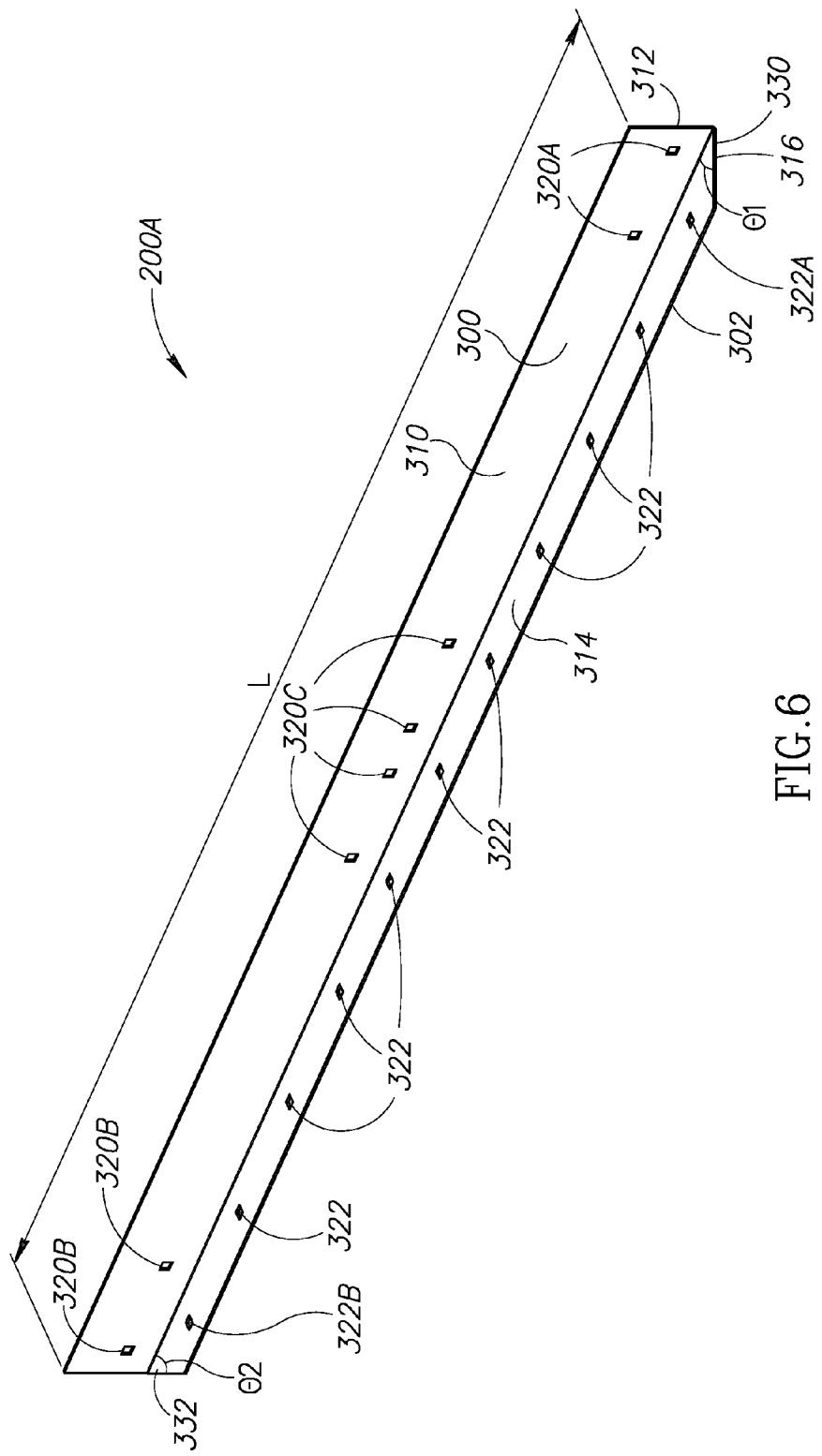
FIG. 6 is a perspective view of a peripheral frame member of the platform assembly of FIG. 5.

Referring to FIG. 6, the peripheral frame member 200A has an L-shaped cross-sectional shape defined by an upright extending sidewall 300 connected to a laterally extending flange 302. The sidewall 300 has an inside surface 310 opposite an outside surface 312 (see also FIG. 7). The flange 302 has an upper surface 314 opposite a lower surface 316 (see also FIG. 7). In the embodiment illustrated, the sidewall 300 is approximately orthogonal to the flange 302. The peripheral frame member 200A has a length L. By way of a non-limiting example, the length L may be approximately four feet. By way of other non-limiting examples, the length L may be approximately two feet or approximately three feet.

The peripheral frame member 200A has a first mitered end 330 opposite a second mitered end 332. One or more through-holes 320A are formed in the sidewall 300 near the first mitered end 330, and one or more through-holes 320B are formed in the sidewall 300 near the second mitered end 332. Additionally, one or more through-holes 320C are formed in the sidewall 300 between the first and second mitered ends 330 and 332. In the embodiment illustrated, the through-holes 320C are positioned approximately midway in between the first and second mitered ends 330 and 332.

A plurality of through-holes 322 are formed in the flange 302. The through-holes 322 include a through-hole 322A near the first mitered end 330, and a through-hole 322B near the second mitered end 332.

An inside angle θ1 of approximately 45 degrees is defined between the edge of the flange 302 at the first mitered end 330 and the inside surface 310 of the sidewall 300. Similarly, an inside angle θ2 of approximately 45 degrees is defined between the edge of the flange 302 at the second mitered end 332 and the inside surface 310 of the sidewall 300. Thus, referring to FIG. 2, at the corner 124, the first mitered end 330 of the peripheral frame member 200A may be positioned against the second mitered end 332 of the peripheral frame member 200F at approximately a right angle. Similarly, at the corner 121, the second mitered end 332 of the peripheral frame member 200A may be positioned against the first mitered end 330 of the peripheral frame member 200B at approximately a right angle. Further, at the corner 122, the second mitered end 332 of the peripheral frame member 200C may be positioned against the first mitered end 330 of the peripheral frame member 200D at approximately a right angle. In addition, at the corner 123, the second mitered end 332 of the peripheral frame member 200D may be positioned against the first mitered end 330 of the peripheral frame member 200E at approximately a right angle.

Returning to FIG. 5, in the embodiment illustrated, the platform assembly 120 includes the four corner braces 210A-210D positioned at the corners 121-124 (see FIG. 2), respectively. Each of the corner braces 210A-210D is configured to join two adjacent ones of the peripheral frame members 200A-200F together at approximately a right angle. The corner braces 210A-210D are substantially identical to one another. For the sake of brevity, only the corner brace 210A will be described in detail.

Figure 7:
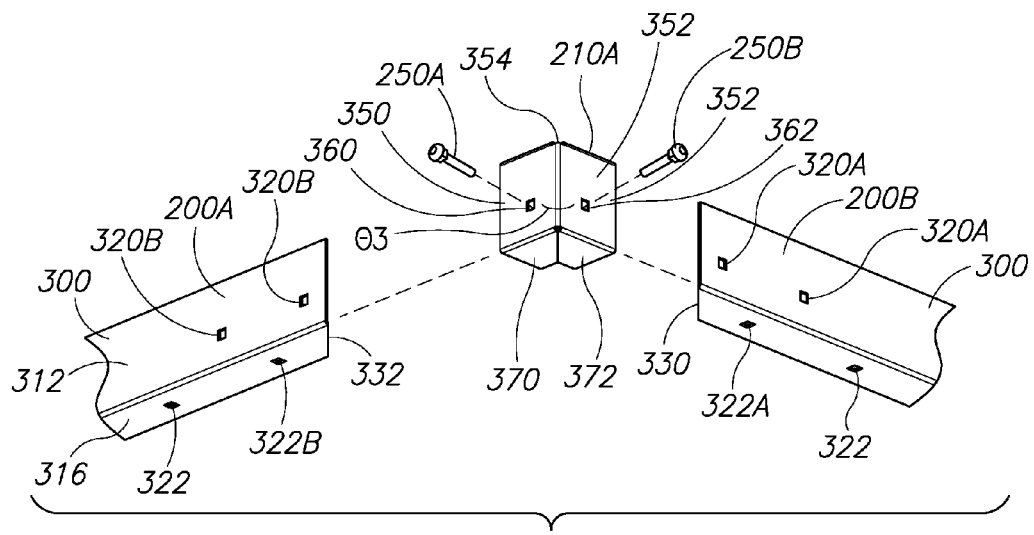
FIG. 7 is a first exploded perspective view of a corner brace and a pair of peripheral frame members of the platform assembly of FIG. 5.
Figure 8:
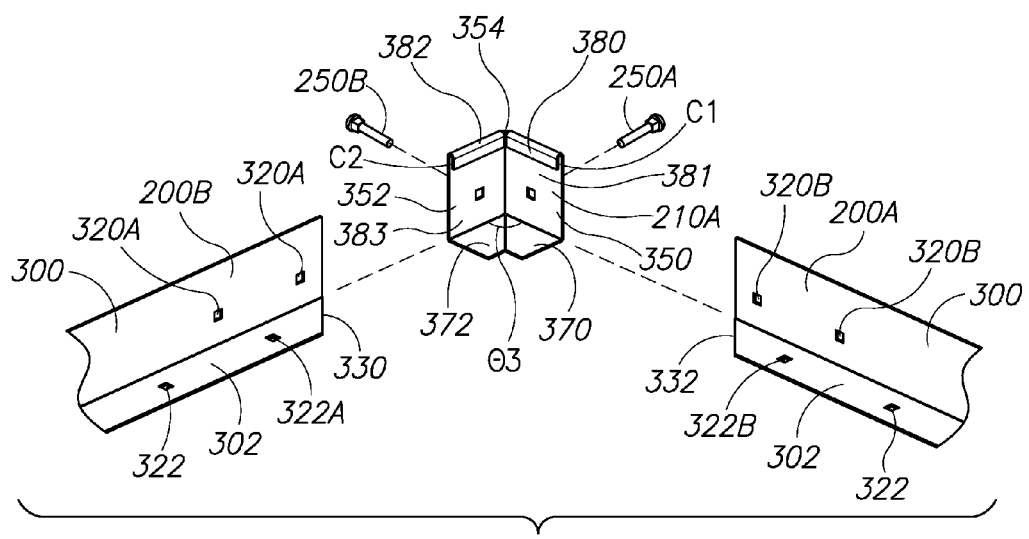
FIG. 8 is a second exploded perspective view of the corner brace and the pair of peripheral frame members of the platform assembly of FIG. 5.

Referring to FIGS. 7 and 8, as mentioned above, at the corner 121 (see FIGS. 2 and 3), the peripheral frame member 200A may be positioned at approximately a right angle with respect to the peripheral frame member 200B with the second mitered end 332 of the peripheral frame member 200A abutting the first mitered end 330 of the peripheral frame member 200B. In this configuration, the corner brace 210A is configured to join the peripheral frame members 200A and 200B together at the corner 121 by clipping onto both the second mitered end 332 of the peripheral frame member 200A and the first mitered end 330 of the peripheral frame member 200B. Referring to FIG. 3, in a similar manner, the corner brace 210B may be used to join the peripheral frame members 200C and 200D together at the corner 122, the corner brace 210C may be used to join the peripheral frame members 200D and 200E together at the corner 123, and the corner brace 210D may be used to join the peripheral frame members 200F and 200A together at the corner 124.

Referring to FIGS. 7 and 8, the corner brace 210A has a first upright extending sidewall portion 350 connected to a second upright extending sidewall portion 352 by a bent portion 354. Referring to FIG. 8, an inside angle θ3 of approximately 90 degrees is defined between the first and second sidewall portions 350 and 352. Referring to FIG. 7, the first sidewall portion 350 has a first through-hole 360 and the second sidewall portion 352 has a second through-hole 362.

A first flange 370 extends inwardly away from the first sidewall portion 350 and a second flange 372 extends inwardly away from the second sidewall portion 352. In the embodiment illustrated, the first sidewall portion 350 is approximately orthogonal to the first flange 370 and the second sidewall portion 352 is approximately orthogonal to the second flange 372. The first and second flanges 370 and 372 may abut one another but may not be connected or affixed to one another. In the embodiment illustrated, the first and second flanges 370 and 372 each have a generally trapezoidal shape.

Referring to FIG. 8, the first sidewall portion 350 has an upper most portion 380 that is folded over toward an inside surface 381 of the first sidewall portion 350 to form a first clip C1. The second sidewall portion 352 has an upper most portion 382 that is folded over toward an inside surface 383 of the second sidewall portion 352 to form a second clip C2. The first and second clips C1 and C2 are each configured to clip onto the sidewall 300 of one of the peripheral frame members 200A-200F at either the first mitered end 330 or the second mitered end 332. In FIG. 8, the first clip C1 clips onto the sidewall 300 of the peripheral frame member 200A at the second mitered end 332, and the second clip C2 clips onto the sidewall 300 of the peripheral frame member 200B at the first mitered end 330. In the embodiment illustrated, the second mitered end 332 of the peripheral frame member 200A is slid longitudinally into engagement with the first clip C1, and the first mitered end 330 of the peripheral frame member 200B is slid longitudinally into engagement with the second clip C2.

A portion of the flange 302 at the second mitered end 332 of the peripheral frame member 200A rests upon the first flange 370 of the corner brace 210A, and a portion of the flange 302 at the first mitered end 330 of the peripheral frame member 200B rests upon the second flange 372 of the corner brace 210A. Thus, both the second mitered end 332 of the peripheral frame member 200A and the first mitered end 330 of the peripheral frame member 200B are prevented from moving laterally with respect to the corner brace 210A. In this manner, the clips C1 and C2 and the flanges 370 and 372 of the corner brace 210A help hold the peripheral frame members 200A and 200B together so while one or more of the optional fasteners 250 may be used to couple the corner brace 210A and the peripheral frame members 200A and 200B together.

Referring to FIG. 7, the first through-hole 360 is positioned to align with one of the through-holes 320B formed in the sidewall 300 of the peripheral frame member 200A so that one of the optional fasteners 250 (identified by reference numeral 250A) may extend therethrough to fasten together the corner brace 210A and the peripheral frame member 200A. The second through-hole 362 is positioned to align with one of the through-holes 320A formed in the sidewall 300 of the peripheral frame member 200B so that one of the optional fasteners 250 (identified by reference numeral 250B) may extend therethrough to fasten together the corner brace 210A and the peripheral frame member 200B.

Figure 9:
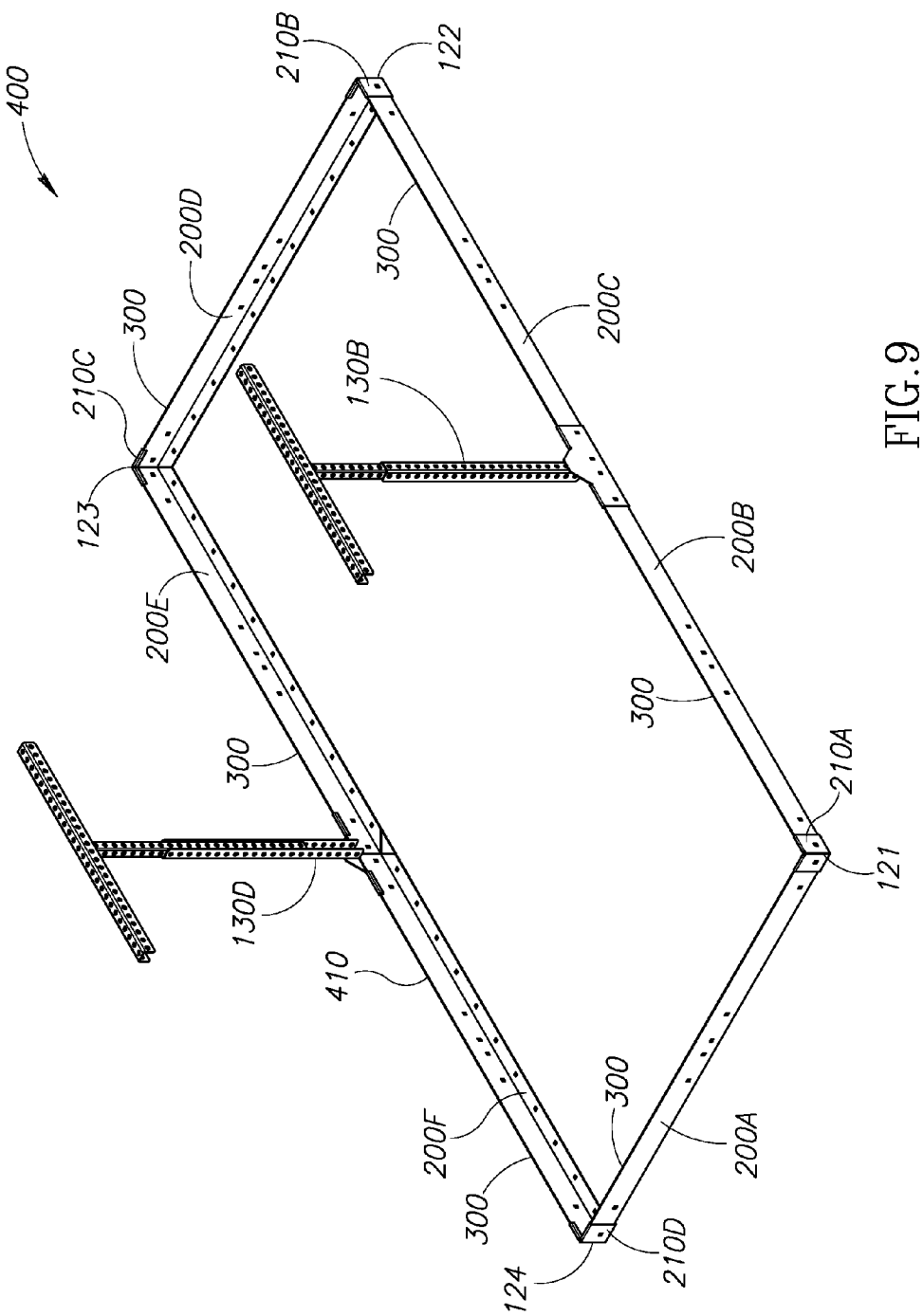
FIG. 9 is a perspective view of a peripheral frame assembly of the platform assembly of FIG. 5.

Referring to FIG. 9, as described above, the peripheral frame members 200A-200F and the corner braces 210A-210D may be assembled together at the corners 121-124. As will be explained below, in the embodiment illustrated, the peripheral frame members 200B and 200C may be coupled (or spliced) together by the support assembly 130B, and the peripheral frame members 200E and 200F may be coupled (or spliced) together by the support assembly 130D. Thus, as illustrated in FIG. 9, the peripheral frame members 200A-200F, the corner braces 210A-210D, and the support assemblies 130B and 130D may be assembled together to form a peripheral frame assembly 400.

The sidewalls 300 of the peripheral frame members 200A-200F and the first and second sidewall portions 350 and 352 (see FIGS. 8 and 9) of the corner braces 210A-210D form a substantially continuous lip 410 that extends around the periphery of the peripheral frame assembly 400. The lip 410 may be any desired height. For example, the lip 410 may be over about two inches tall. The lip 410 extends substantially continuously around (or surrounds) a central storage area of the platform assembly 120 in which the items 112 (see FIGS. 1A and 1B) may be placed.

Referring to FIG. 5, each of the cross braces 220A-220J is coupled to the peripheral frame assembly 400 (see FIG. 9). Within the peripheral frame assembly 400, the cross braces 220A-220J are substantially parallel with one another. Further, the cross braces 220A-220J are substantially parallel with the peripheral frame members 200A and 200D positioned opposite one another in the peripheral frame assembly 400. Thus, in the embodiment illustrated, the cross braces 220A-220J are approximately orthogonal to the peripheral frame members 200B, 200C, 200E and 200F.

In the embodiment illustrated, the platform assembly 120 includes the ten cross braces 220A-220J. The cross braces 220A-220J are substantially identical to one another. For the sake of brevity, only the cross brace 220A will be described in detail.

Figure 10:
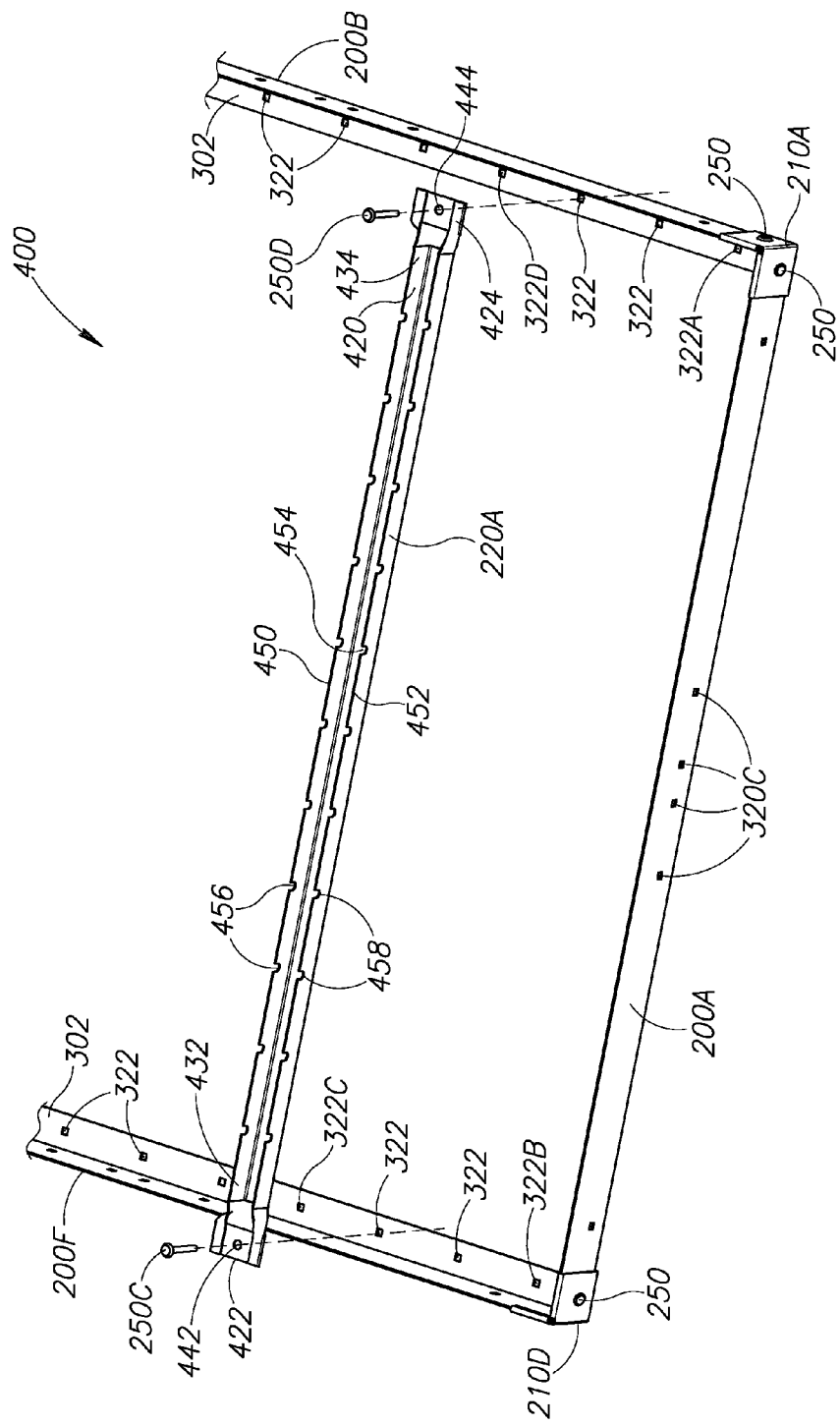
FIG. 10 is an enlarged partially exploded perspective view of a cross brace and the peripheral frame assembly of the platform assembly of FIG. 5.

Referring to FIG. 10, the cross brace 220A has an elongated body portion 420, and a first connector portion 422 opposite a second connector portion 424. The first and second connector portions 422 and 424 are substantially identical to one another.

The cross brace 220A may extend between two of the peripheral frame members 200A-200F that are opposite one another within the peripheral frame assembly 400. In the embodiment illustrated, the cross brace 220A has a length that is slightly less than the length L (see FIG. 6) of the peripheral frame member 200A. Thus, the cross brace 220A is not long enough to extend between the peripheral frame members 200A and 200D (see FIG. 9). However, the cross brace 220A may extend between the peripheral frame members 200B and 200F or the peripheral frame members 200C and 200E (see FIG. 9). The first connector portion 422 is configured to couple the body portion 420 to a first one of the peripheral frame members 200E or 200F, and the second connector portion 424 is configured to couple the body portion 420 to a second one of the peripheral frame members 200B or 200C that is opposite the first peripheral frame member in the peripheral frame assembly 400. In FIG. 10, the cross brace 220A has been illustrated extending between the peripheral frame members 200B and 200F.

The first connector portion 422 includes a first through-hole 442 configured to be aligned with one of the through-holes 322 formed in the flange 302 of either the peripheral frame member 200F or the peripheral frame member 200E. For ease of illustration, in FIG. 10, the first through-hole 442 is illustrated aligned with one of the through-holes 322 (identified with reference numeral 322C) formed in the flange 302 of the peripheral frame member 200F. When the through-holes 442 and 322C are so aligned, one of the optional fasteners 250 (identified with reference numeral 250C) may be inserted through the aligned through-holes to fasten the cross brace 220A to the peripheral frame member 200F. In a similar manner, the cross braces 220B-220E may be fastened to the peripheral frame member 200F, and the cross braces 220E-220J may be fastened to the peripheral frame member 200E.

The second connector portion 424 includes a second through-hole 444 configured to be aligned with one of the through-holes 322 are formed in the flange 302 of either the peripheral frame member 200B or the peripheral frame member 200C. For ease of illustration, in FIG. 10, the second through-hole 444 is illustrated aligned with one of the through-holes 322 (identified with reference numeral 322D) formed in the flange 302 of the peripheral frame member 200B. When the through-holes 444 and 322D are so aligned, one of the optional fasteners 250 (identified with reference numeral 250D) may be inserted through the aligned through-holes to fasten the cross brace 220A to the peripheral frame member 200B. In a similar manner, the cross braces 220B-220E may be fastened to the peripheral frame member 200B, and the cross braces 220E-220J may be fastened to the peripheral frame member 200C.

In the embodiment illustrated, the body portion 420 has a generally U-shaped cross-sectional shape with a pair of spaced apart upwardly extending sidewalls 450 and 452 joined together by a substantially planar base portion 454. In the embodiment illustrated, the sidewalls 450 and 452 are substantially orthogonal to the base portion 454. However, in alternate embodiments (not shown), the body portion 420 may have a generally V-shaped cross-sectional shape in which the substantially planar base portion 454 is omitted and the sidewalls 450 and 452 are joined together along one longitudinally extending edge.

A plurality of first grooves or notches 456 are formed in the sidewall 450. A plurality of second grooves or notches 458 are formed in the sidewall 452. The first and second notches 456 and 458 are aligned with one another and configured to at least partially receive the poles 230A-230K (see FIG. 5). The first and second notches 456 and 458 may be configured to grip the poles 230A-230K in a snap-fit type connection.

Referring to FIG. 5, as mentioned above, within the peripheral frame assembly 400 (see FIG. 9), the cross braces 220A-220J are substantially parallel with one another. Further, the first and second notches 456 and 458 (see FIG. 10) formed in the body portions 420 (see FIG. 10) of the cross braces 220A-220J are aligned within the peripheral frame assembly 400 and form rows of aligned notches across the substantially parallel cross braces 220A-220J. These rows may be substantially orthogonal to the cross braces 220A-220J. The rows include a different row for each of the poles 230A-230K. Each of the poles 230A-230K may be positioned within those of the notches 456 and 458 aligned along the same row. In the embodiment illustrated, the poles 230A-230K snap into the aligned notches 456 and 458 and are held in place thereby. Thus, the poles 230A-230K are transverse to the cross braces 220A-220J. In the embodiment illustrated, the poles 230A-

230K extend across the peripheral frame assembly 400 between the peripheral frame members 200A and 200D.

In the embodiment illustrated, the platform assembly 120 includes the eleven poles 230A-230K. The poles 230A-230K are substantially identical to one another. For the sake of brevity, only the pole 230A will be described in detail.

Referring to FIG. 4, in the embodiment illustrated, the pole 230A is elongated and has a generally circular cross-sectional shape configured to be at least partially received inside those of the first and second notches 456 and 458 (see FIG. 10) aligned along the same row extending across the substantially parallel cross braces 220A-220J (see FIG. 5). Similarly, the poles 230B-230K are configured to be at least partially received inside those of the first and second notches 456 and 458 (see FIG. 10) aligned along different rows extending across the substantially parallel cross braces 220A-220J (see FIG. 5).

The pole 230A has a first end portion P1 opposite a second end portion P2. Referring to FIG. 5, the first end portion P1 is configured to rest upon the flange 302 of the peripheral frame member 200A, and the second end portion P2 is configured to rest upon the flange 302 of the peripheral frame member 200D. Similarly, the first end portion P1 of the poles 230B-230K may rest upon the flange 302 of the peripheral frame member 200A, and the second end portion P2 of the poles 230B-230K may rest upon the flange 302 of the peripheral frame member 200D.

Referring to FIG. 4, the pole 230A may be constructed by joining a first pole segment 460 to a second pole segment 462 with one of the optional tube-shaped pole couplers 240. The poles 230B-230K may be constructed in a substantially identical manner. By way of a non-limiting example, the first and second pole segments 460 and 462 may be constructed from fiberglass. Referring to FIG. 5, in the embodiment illustrated, the first pole segment 460 is long enough to extend between the cross braces 220A-220E, and the second pole segment 462 is long enough to extend between the cross braces 220E-220J. The poles 230A-230K may each be made longer by adding one or more additional pole segments (like the first pole segment 460) using one or more of the tube-shaped pole couplers 240.

In alternate embodiments, the optional tube-shaped pole couplers 240 may be omitted. In embodiments that omit the optional tube-shaped pole couplers 240 and in which the poles 230A-230K include two or more pole segments, the poles 230A-230K may be characterized as being discontinuous. Such discontinuous poles each include one or more pole segments like the first pole segment 460. The pole segments of each of the discontinuous poles are positioned end-to-end in a linear arrangement and pressed into the first and second notches 456 and 458 (see FIG. 10) aligned along the same row within the peripheral frame assembly 400. In such embodiments, the pole segments of each of the discontinuous poles are disconnected from one another. However, adjacent pole segments may abut one another. Alternatively, adjacent pole segments may be spaced apart from one another. In some embodiments, fewer than all of the poles 230A-230K may be discontinuous. Further, within a discontinuous pole, some, but not all, of the adjacent pole segments may be coupled together (e.g., using optional tube-shaped pole couplers 240).

While the peripheral frame members 200A-200F have been described as being substantially identical to one another, in alternate embodiments two or more of the peripheral frame members 200A-200F may have different lengths than the other peripheral frame members. In such embodiments, the cross braces 220A-220J and/or the poles 230A-230K may be sized to accommodate peripheral frame members having different lengths. Further, different numbers of cross braces and/or poles than have been described above may be used to construct the platform assembly 120.

Support Assemblies

Referring to FIGS. 2 and 3, the support assemblies 130A-130D are positioned between but not at the corners 121-124 of the peripheral frame assembly 400. This allows users to place the items 112 (see FIGS. 1A and 1B) on the storage rack 100 at the corners 121-124. In other words, the storage rack 100 may be characterized as being "open" at its corners 121-124 because unobstructed access to the corners of the platform assembly 120 is provided by the storage rack 100. In contrast, many prior art hanging shelves position supports at the corners, which can cause items to wedge together between adjacent shelf supports.

The positioning and configuration of the support assemblies 130A-130D may help stiffen the storage rack 100. Further, positioning the support assemblies 130A and 130C opposite one another at the ends of the platform assembly 120 and positioning the support assemblies 130B and 130D opposite one another along the sides of the platform assembly 120 helps prevent the storage rack 100 from swinging. This may be particularly useful when the items 112 (see FIGS. 1A and 1B) are loaded onto the storage rack 100.

In the embodiment illustrated, the storage rack 100 includes the four support assemblies 130A-130D. The support assemblies 130A-130D are substantially identical to one another. For the sake of brevity, only the support assembly 130A will be described in detail.

Referring to FIGS. 11 and 12, the support assembly 130A includes a mounting bracket 500, an upright support 502, an upright member 504, and a side bracket 506.

Referring to FIG. 13, the mounting bracket 500 is configured to be mounted or fastened to one or more of the support structures 110A-110F (see FIG. 1B). As shown in FIG. 1A, it may be desirable to attach the mounting bracket 500 of each of the support assemblies 130A-130D to two or more of the support structures 110A-110F (e.g., ceiling trusses). However, as shown in FIG. 1B, this is not a requirement.

Referring to FIG. 13, the mounting bracket 500 has a generally U-shaped cross-sectional shape with a pair of spaced apart downwardly extending sidewalls 510 and 512 joined together by a substantially planar base portion 514. A downwardly opening internal channel 516 is defined between the sidewalls 510 and 512 and the base portion 514. A plurality of through-holes 518 are formed in the sidewall 510, and a plurality of through-holes 519 (see FIG. 12) are formed in the sidewall 512. Referring to FIG. 12, the through-holes 518 are aligned across the channel 516 with the through-holes 519. Each pair of the aligned through-holes 518 and 519 is configured to receive one of the optional fasteners 250.

Referring to FIG. 13, a plurality of through-holes 520 are formed in the base portion 514. The through-holes 520 include through-holes 520A and 520B. Each of the through-holes 520 is configured to receive one of the optional fasteners 250. The mounting bracket 500 may be fastened to one or more of the support structures 110A-110F (see FIG. 1A) by positioning each of one or more of the optional fasteners 250 in one of the through-holes 520 and attaching the fastener to at least one of the support structures 110A-110F (see FIG. 1A). By way of a non-limiting example, in FIG. 13, two of the optional fasteners 250 (identified by reference numerals 250E and 250F) are used to attach the mounting bracket 500 to one or more of the support structures 110A-110F (see FIG. 1A). The fasteners 250E and 250F are received by the through-holes 520A and 520B, respectively. The fasteners 250E and 250F may be configured to extend into the support structures 110A-110F (see FIG. 1A) and form a connection therewith.

By way of a non-limiting example, referring to FIG. 1A, the mounting bracket 500 of the support assembly 130A may be fastened to the support structures 110A and 110B, the mounting bracket 500 of the support assembly 130B may be fastened to the support structures 110C and 110D, the mounting bracket 500 of the support assembly 130C may be fastened to the support structures 110E and 110F, and the mounting bracket 500 of the support assembly 130D may be fastened to the support structures 110C and 110D. Thus, in this example, each of the support assemblies 130A-130D is attached to two of the support structures 110A-110F. By way of another non-limiting example, referring to FIG. 1B, the mounting brackets 500 of the support assemblies 130A-130D may each be fastened to the support structure 110A. Thus, in this example, all of the support assemblies 130A-130D are attached to the same support structure 110A.

The upright support 502 is elongated with a generally square cross-sectional shape defined by sidewalls 531-534. In the embodiment illustrated, a continuous internal channel 536 extends through the upright support 502 but this is not a requirement. In alternate embodiments, the upright support 502 may be partially or completely solid.

The sidewalls 531 and 533 are opposite one another across the internal channel 536. A plurality of through-holes 538 are formed in the sidewall 531, and a plurality of through-holes 539 (see FIG. 12) are formed in the sidewall 533. The through-holes 538 are aligned across the channel 536 with the through-holes 539 (see FIG. 12). Each pair of the aligned through-holes 538 and 539 is configured to receive one of the optional fasteners 250.

The sidewalls 532 and 534 are opposite one another across the internal channel 536. A plurality of through-holes 535 are formed in the sidewall 532, and a plurality of through-holes 537 (see FIG. 15) are formed in the sidewall 534. The through-holes 535 are aligned across the channel 536 with the through-holes 537. Each pair of the aligned through-holes 535 and 537 is configured to receive one of the optional fasteners 250.

The upright support 502 is generally elongated and has a first end portion 540 opposite a second end portion 542. The first end portion 540 is configured to be received inside the internal channel 516 of the mounting bracket 500. When the first end portion 540 is so received, as illustrated in FIG. 13, the sidewalls 531 and 533 may be adjacent the downwardly extending sidewalls 510 and 512, respectively, of the mounting bracket 500. One or more of the optional fasteners 250 (identified by reference numeral 250G) may be used to fasten the upright support 502 to the mounting bracket 500. For example, a selected pair (identified by reference numeral 538A) of the aligned through-holes 538 and 539 located in the first end portion 540 may be aligned with a selected pair (identified by reference numeral 518A) of the aligned through-holes 518 and 519 formed in the sidewalls 510 and 512 of the mounting bracket 500. Then, one of the optional fasteners 250 may be inserted through the aligned pairs 518A and 538A of through-holes 518, 519, 538, and 539.

Figure 17:
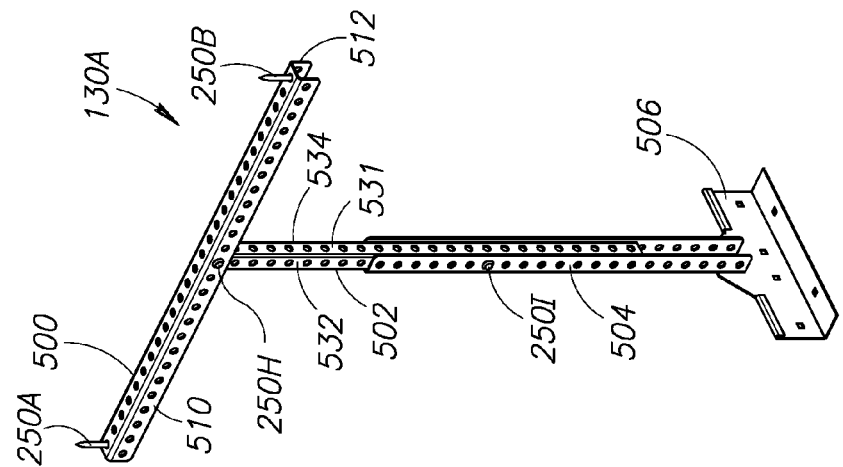
FIG. 17 is a third perspective view of the support assembly of FIG. 11 in which the mounting bracket is substantially orthogonal to the side bracket.

Alternatively, as shown in FIG. 17, the mounting bracket 500 may be rotated approximately 90 degrees with respect to the upright support 502. Then, referring to FIG. 13, the first end portion 540 may be received inside the internal channel 516 of the mounting bracket 500. In this configuration, the sidewalls 532 and 534 of the upright support 502 are adjacent to the downwardly extending sidewalls 510 and 512, respectively, of the mounting bracket 500. A selected pair of the aligned through-holes 535 and 537 located in the first end portion 540 may be aligned with a selected pair of the aligned through-holes 518 and 519 formed in the sidewalls 510 and 512 of the mounting bracket 500. Then, one of the optional fasteners 250 (identified by reference numeral 250H in FIG. 17) may be inserted through the aligned through-holes 518, 519, 535, and 537 to fasten the upright support 502 and the mounting bracket 500 together.

The sidewalls 510 and 512 of the mounting bracket 500 provide support for and may help stiffen the upright support 502 along opposing ones of its sidewalls, namely the sidewalls 531 and 533 or the sidewalls 532 and 534.

Figure 14:
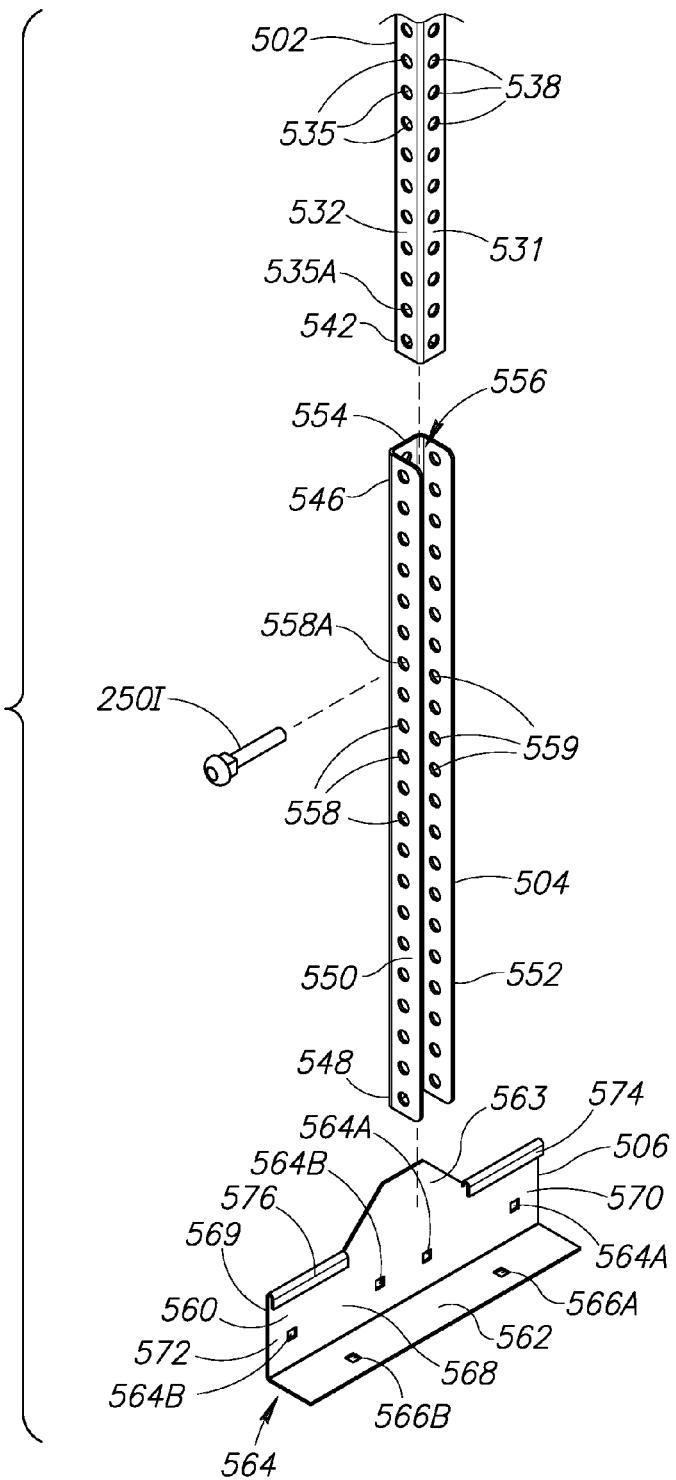
FIG. 14 is a second enlarged portion of FIG. 11.

Referring to FIGS. 11 and 12, the upright member 504 may be substantially similar to the mounting bracket 500. Referring to FIG. 14, in the embodiment illustrated, the upright member 504 is generally elongated having a first end portion 546 opposite a second end portion 548. The upright member 504 has a generally U-shaped cross-sectional shape with a pair of spaced apart laterally extending sidewalls 550 and 552 joined together by a substantially planar base portion 554. An internal channel 556 is defined between the sidewalls 550 and 552 and the base portion 554. The channel 556 is open at both the first and second end portions 546 and 548.

A plurality of through-holes 557 (see FIG. 12) are formed in the base portion 554. Each of the through-holes 557 is configured to receive one of the optional fasteners 250. A plurality of through-holes 558 are formed in the sidewall 550, and a plurality of through-holes 559 are formed in the sidewall 552. The through-holes 558 are aligned across the channel 556 with the through-holes 559. Each pair of the aligned through-holes 558 and 559 is configured to receive one of the optional fasteners 250.

The channel 556 is configured to receive the second end portion 542 of the upright support 502. When the second end portion 542 of the upright support 502 is positioned inside the channel 556, the upright support 502 extends longitudinally and upwardly beyond the first end portion 546.

Figure 16:
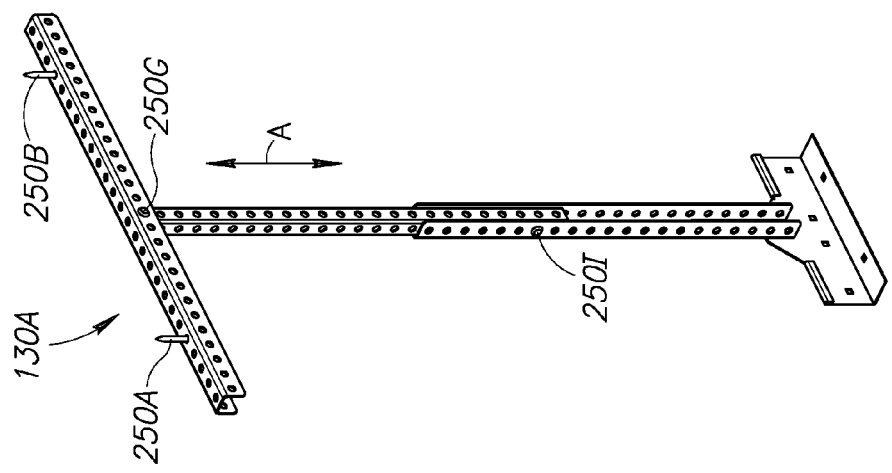
FIG. 16 is a second perspective view of the support assembly of FIG. 11 in which a distance between the mounting bracket and the side bracket has been increased from that shown in FIG. 15.
Figure 15:
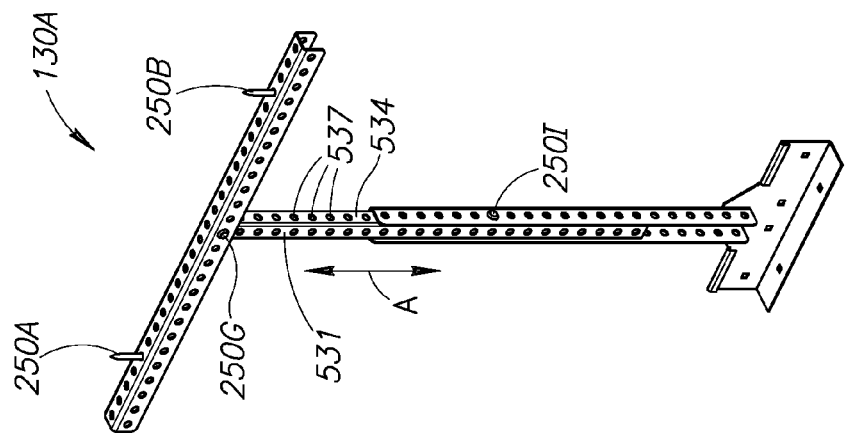
FIG. 15 is a perspective view of the support assembly of FIG. 11 in which a mounting bracket of the support assembly is substantially parallel with a side bracket of the support assembly.

Referring to FIGS. 15 and 16, the upright support 502 may be slidable within the channel 556 (see FIG. 14) along directions indicated by double headed arrow "A" to adjust the length of the support assembly 130A.

Referring to FIG. 14, when the upright support 502 is received inside the channel 556, a selected pair (identified by reference numeral 535A) of the aligned through-holes 535 and 537 may be aligned with a selected pair (identified by reference numeral 558A) of the aligned through-holes 558 and 559. Then, one of the optional fasteners 250 (identified by reference numeral 250I) may be positioned within the selected aligned pairs 535A and 558A of through-holes 558, 559, 535, and 537 to fasten the upright support 502 and the upright member 504 together. Alternatively, a selected pair of the aligned through-holes 538 and 539 may be aligned with a selected pair of the aligned through-holes 558 and 559. Then, one of the optional fasteners 250 may be positioned within the selected aligned pairs of through-holes 558, 559, 538, and 539 to fasten the upright support 502 and the upright member 504 together. By way of yet another example, one of the through-holes 557 (see FIG. 12) may be aligned with either a selected pair of the aligned through-holes 538 and 539 or a selected pair of the aligned through-holes 535 and 537. Then, one of the optional fasteners 250 may be positioned within the aligned through-holes 557, 538, and 539 or the aligned through-holes 557, 535, and 537 to fasten the upright support 502 and the upright member 504 together.

Referring to FIG. 14, the second end portion 548 of the upright member 504 is coupled (e.g., welded, glued, riveted, bolted, and the like) to the side bracket 506. The side bracket 506 has an upright extending sidewall 560 connected to a flange 562. In the embodiment illustrated, the sidewall 560 is approximately orthogonal to the flange 562. Optionally, the sidewall 560 may include an upwardly extending mounting portion 563 to which the second end portion 548 of the upright member 504 may be coupled (e.g., welded).

The sidewall 560 has an inwardly facing surface 568 opposite an outwardly facing surface 569, and a first end portion 570 opposite a second end portion 572. A through-hole 566A is formed in the flange 562 near the first end portion 570, and a through-hole 566B is formed in the flange 562 near the second end portion 572. A plurality of through-holes 564 are formed in the sidewall 560. The through-holes 564 include through-holes 564A formed near the first end portion 570, and through-holes 564B formed near the second end portion 572. The first end portion 570 has an upper most portion 574 that is folded over toward the inwardly facing surface 568 to form a third clip C3 (see FIG. 18). The second end portion 572 has an upper most portion 576 that is folded over toward the inwardly facing surface 568 to form a fourth clip C4 (see FIG. 18).

Referring to FIGS. 2 and 3, each of the support assemblies 130A-130D may be coupled to a single one of the peripheral frame members 200A-200F or used to spice two of the peripheral frame members 200A-200F together. The side bracket 506 is configured to be clipped to one or two of the peripheral frame members 200A-200F. For example, in FIG. 4, the side bracket 506 of the support assembly 130A is clipped to the peripheral frame member 200A. On the other hand, the side bracket 506 of the support assembly 130D is clipped to the peripheral frame members 200E and 200F.

Clipping the side bracket 506 to a single one of the peripheral frame members 200A-200F will be described first. For ease of illustration, the side bracket 506 will be described as being clipped to the peripheral frame member 200A. Referring to FIG. 11, the clips C3 and C4 are each configured to clip onto the sidewall 300 (see FIG. 6) of the peripheral frame member 200A (see FIG. 6). Referring to FIG. 14, the through-holes 564 formed in the sidewall 560 are positioned to align with the through-holes 320C (see FIG. 6) formed in the sidewall 300 (see FIG. 6) of the peripheral frame member 200A (see FIG. 6). The sidewall 300 may be slid longitudinally into and through the third and fourth clips C3 and C4 until the through-holes 564 are aligned with the through-holes 320C (see FIG. 6). In this configuration, the flange 302 of the peripheral frame member 200A may rest upon the flange 562 of the side bracket 506. Thus, the peripheral frame member 200A is prevented from moving laterally with respect to the side bracket 506. Then, one or more of the optional fasteners 250 (e.g., identified with reference numerals 250J-250M in FIG. 4) may be inserted through the aligned through-holes 564 and 320C and used to fasten the sidewall 560 of the side bracket 506 to the sidewall 300 of the peripheral frame member 200A. Optionally, the through-holes 566A and 566B formed in the flange 562 may be aligned with two of the through-holes 322 (see FIG. 6) formed in the flange 302 (see FIG. 6) of the peripheral frame member 200A, and one or more of the optional fasteners 250 may be inserted in the aligned through-holes to fasten the flange 562 to the flange 302.

Clipping the side bracket 506 to two of the peripheral frame members 200A-200F (see FIG. 5) will now be described. Referring to FIG. 9, the peripheral frame members 200B and 200C may be coupled (or spliced) together by the side bracket 506 of the support assembly 130B, and the peripheral frame members 200E and 200F may be coupled (or spliced) together by the side bracket 506 of the support assembly 130D. Because the splice formed by the side bracket 506 of the support assembly 130D is substantially identical to the splice formed by the side bracket 506 of the support assembly 130B, only the splice formed by the side bracket 506 of the support assembly 130B will be described in detail.

Figure 18:
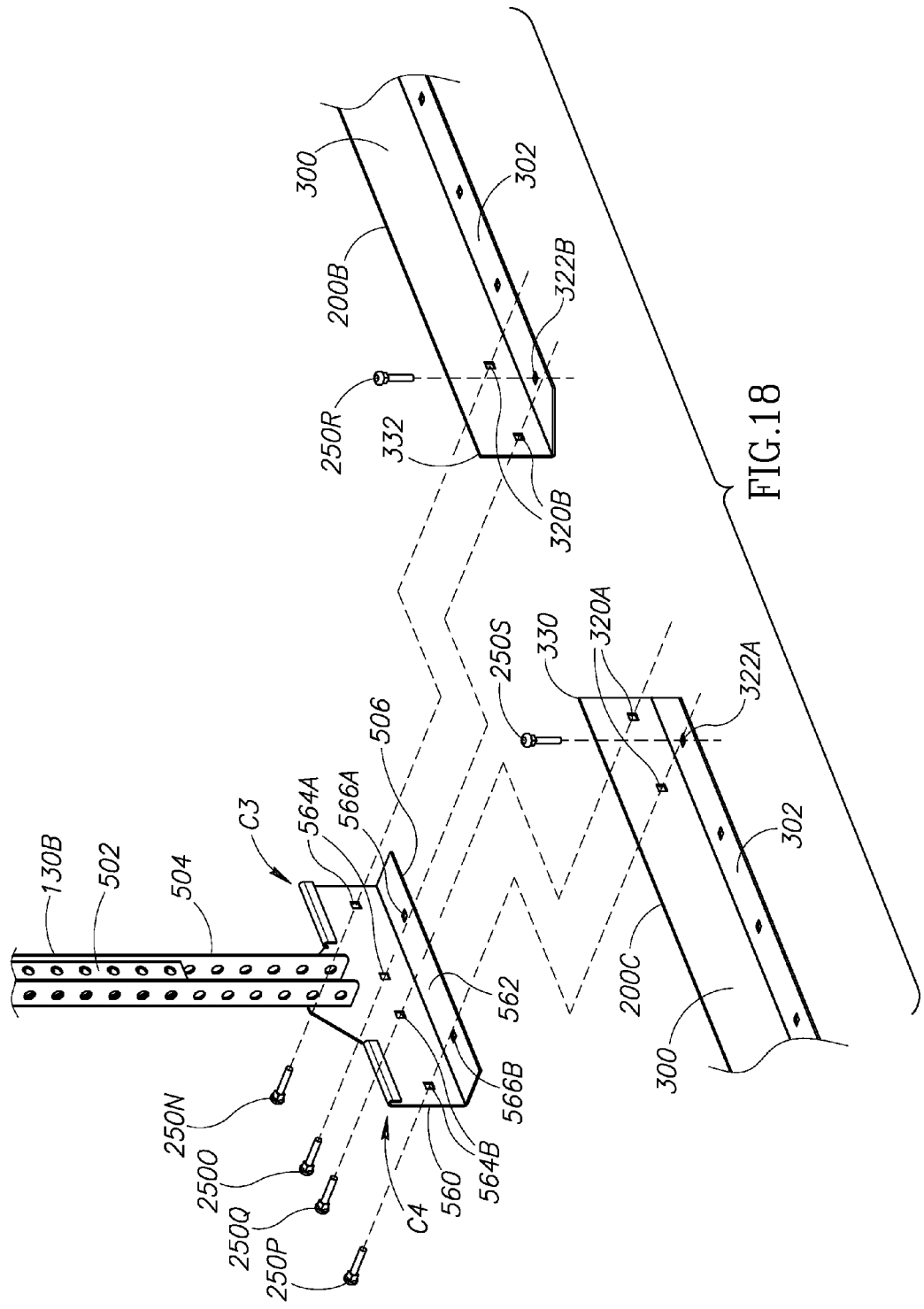
FIG. 18 is an exploded perspective view of a side bracket of a support assembly splicing together a pair of peripheral frame members of the platform assembly of FIG. 5.

Referring to FIG. 18, the third clip C3 is configured to clip onto the sidewall 300 at the second mitered end 332 of the peripheral frame member 200B and the fourth clip C4 is configured to clip onto the sidewall 300 at the first mitered end 330 of the peripheral frame member 200C. In the embodiment illustrated, the second mitered end 332 of the peripheral frame member 200B is slid into the third clip C3, and the first mitered end 330 of the peripheral frame member 200C is slid into the fourth clip C4. The through-holes 564A are positioned to align with the through-holes 320B formed in the sidewall 300 of the peripheral frame member 200B so that one or more of the optional fasteners 250 (identified by reference numerals 250N and 250O) may extend therethrough to fasten together the side bracket 506 and the peripheral frame member 200B. The through-holes 564B are positioned to align with the through-holes 320A formed in the sidewall 300 of the peripheral frame member 200C so that one or more of the optional fasteners 250 (identified by reference numerals 250P and 250Q) may extend therethrough to fasten together the side bracket 506 and the peripheral frame member 200C.

Depending upon the implementation details, the second mitered end 332 of the peripheral frame member 200B may be slid into the third clip C3, and the first mitered end 330 of the peripheral frame member 200C may be slid into the fourth clip C4 until the second mitered end 332 of the peripheral frame member 200B abuts the first mitered end 330 of the peripheral frame member 200C. When this occurs, the through-holes 564A may be aligned or nearly aligned with the through-holes 320B, and the through-holes 564B may be aligned or nearly aligned with the through-holes 320A. If necessary, the peripheral frame member 200B and/or the peripheral frame member 200C may be slid within the side bracket 506 to align the through-holes 564A with the through-holes 320B, and to align the through-holes 564B with the through-holes 320A. Then, one or more of the optional fasteners 250 (identified by the reference numerals 250N and 250O) may be extended through the aligned through-holes 564A and 320B to fasten together the side bracket 506 and the peripheral frame member 200B, and one or more of the optional fasteners 250 (identified by the reference numerals 250P and 250Q) may be extended through the aligned through-holes 564B and 320A to fasten together the side bracket 506 and the peripheral frame member 200C.

Optionally, the through-hole 566A formed in the flange 562 may be aligned with the through-hole 322B formed in the flange 302 of the peripheral frame member 200B, and one of the optional fasteners 250 (identified by reference numeral 250R in FIG. 18) may be inserted in the aligned through-holes to fasten the flange 562 to the flange 302 of the peripheral frame member 200B. Further, the through-hole 566B formed in the flange 562 may be aligned with the through-hole 322A formed in the flange 302 of the peripheral frame member 200C, and one of the optional fasteners 250 (identified by reference numeral 250S in FIG. 18) may be inserted in the aligned through-holes to fasten the flange 562 to the flange 302 of the peripheral frame member 200C.

The storage rack 100 may include four or more support assemblies like the support assembly 130A. In the embodiment illustrated in FIG. 3, the storage rack 100 includes the four support assemblies 130A-130D. The support assemblies 130A and 130C are attached to the peripheral frame members 200A and 200D, respectively, the support assembly 130B is used to splice the peripheral frame members 200B and 200C together, and the support assembly 130D is used to splice the peripheral frame members 200E and 200F together. However, in alternate embodiments (not shown), the side between the corners 121 and 122 and the side between the corners 123 and 124 may be lengthened by splicing additional peripheral frame members (each like the peripheral frame member 200A) to each side using additional support assemblies like the support assembly 130A. In this manner, the length of the storage rack 100 may be increased. In such embodiments, additional cross braces (each like the cross brace 220A) may be used to form the platform assembly 120. By way of a non-limiting example, for each additional peripheral frame member added to one of the sides, six additional cross braces may be used to construct the platform assembly 120. The poles 230A-230K may be lengthened by adding an additional pole segment (like the first pole segment 460) to each of the poles 230A-230K using one of the optional tube-shaped pole couplers 240. However, as explained above, one or more of the poles 230A-230K may be discontinuous. Discontinuous poles may each be lengthened by adding an additional pole segment (like the first pole segment 460) to the discontinuous pole without coupling the additional pole segment to any other pole segment of the discontinuous pole.

Alternate Embodiment

Figure 19:
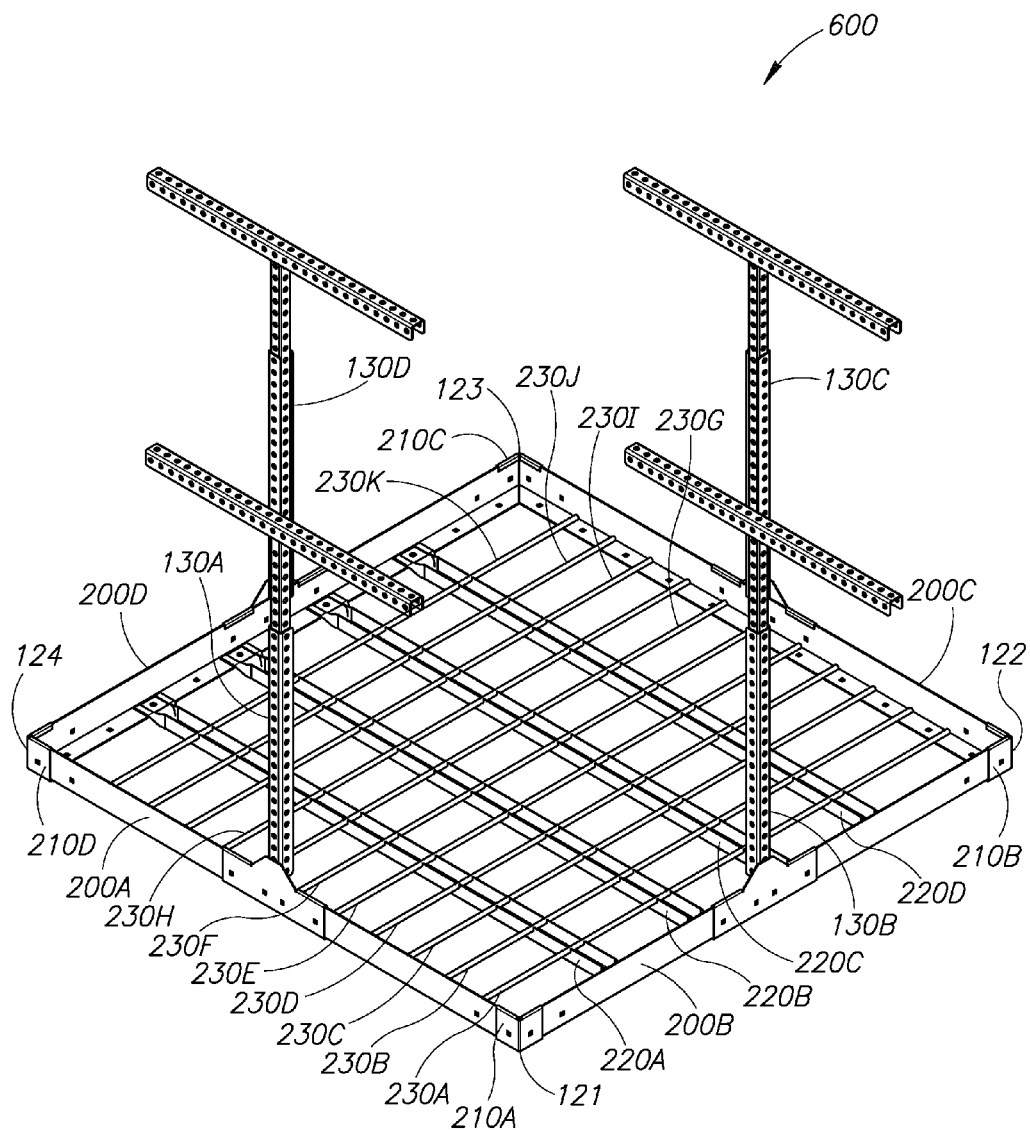
FIG. 19 is a perspective view of a first alternate embodiment of the storage rack.

In an alternate embodiment illustrated in FIG. 19, a storage rack 600 includes only the four peripheral frame members 200A-200D. In this embodiment, the support assemblies 130A-130D are attached to the peripheral frame members 200A-200D, respectively, and none of the support assemblies 130A-130D are used to form a splice. This embodiment includes only the cross braces 220A-220D. Further, in this embodiment, the poles 230A-230K each include only the first pole segment 460 (see FIGS. 4 and 5) and omit both the second pole segment 462 (see FIGS. 4 and 5) and the optional tube-shaped pole coupler 240 (see FIGS. 4 and 5).

Alternate Embodiment

Figure 20:
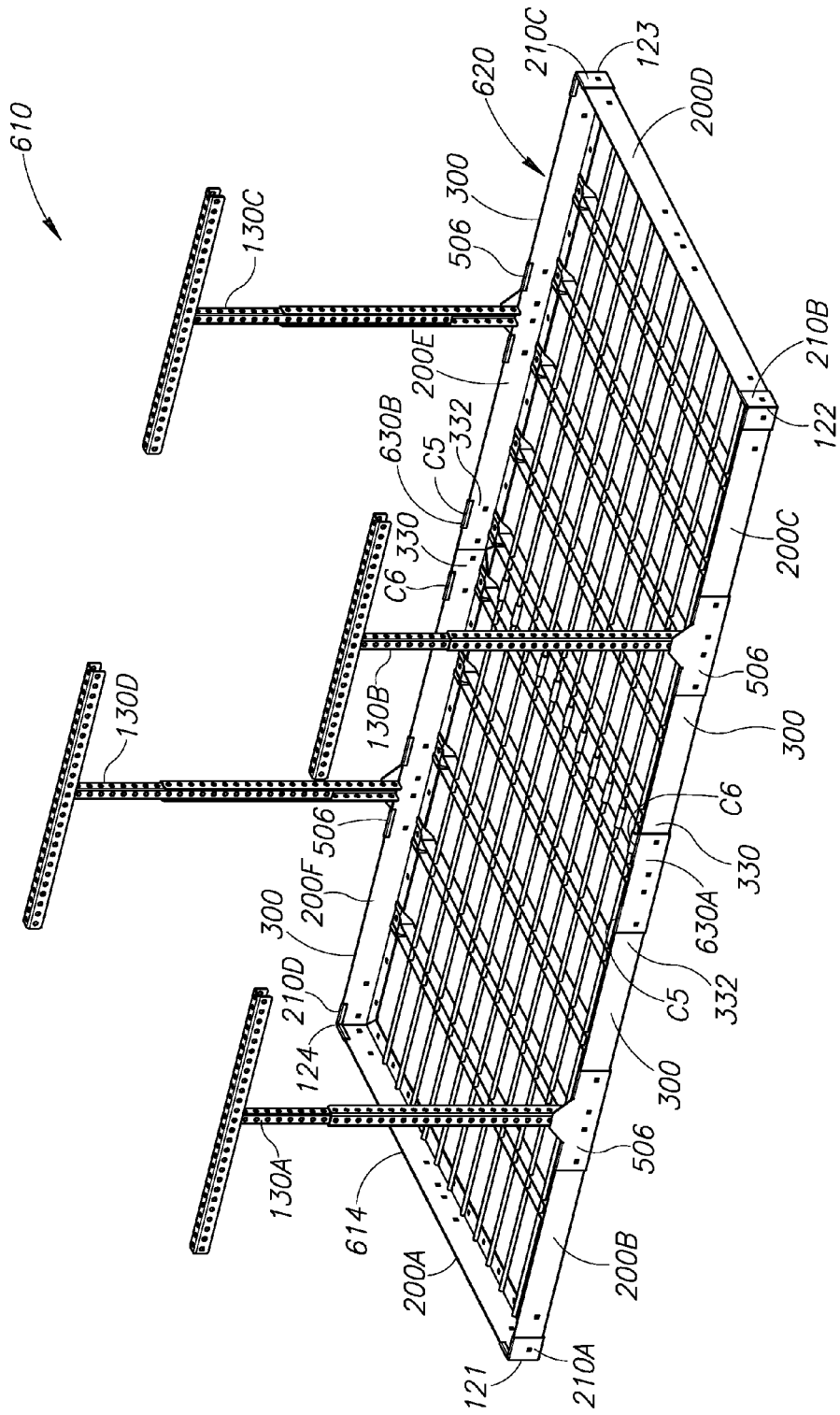
FIG. 20 is a perspective view of a second alternate embodiment of the storage rack.

In an alternate embodiment illustrated in FIG. 20, a storage rack 610 includes a platform assembly 620 substantially similar to the platform assembly 120 (see FIG. 5). However, in the platform assembly 620, none of the support assemblies 130A-130D are coupled to the peripheral frame members 200A and 200D. Instead, the support assemblies 130A-130D are coupled to the peripheral frame members 200B, 200C, 200E, and 200F, respectively. Clipping the side bracket 506 of one of the support assemblies 130A-130D to a single one of the peripheral frame members 200A-200F has been described above and will not be repeated here.

In the platform assembly 620, none of the support assemblies 130A-130D are used to couple (or splice) any of the peripheral frame members 200A-200F together. Instead, the peripheral frame members 200B and 200C are coupled together by a splicing bracket 630A, and the peripheral frame members 200E and 200F are coupled together by a splicing bracket 630B.

The peripheral frame members 200A-200F and the corner braces 210A-210D may be assembled together at the corners 121-124 as described above with respect to the platform assembly 120 (see FIG. 5). Thus, the peripheral frame members 200A-200F, the corner braces 210A-210D, and the splicing brackets 630A and 630B may be assembled together to form a peripheral frame assembly 614. The cross braces 220A-220J (see FIG. 5) and the poles 230A-230K (see FIG. 5) may be attached to the peripheral frame assembly 614 in the same manner (described above) that these components are attached to the peripheral frame assembly 400 (see FIG. 9).

The splicing brackets 630A and 630B are substantially identical to one another. For the sake of brevity, only the splicing bracket 630A will be described in detail.

Figure 24:
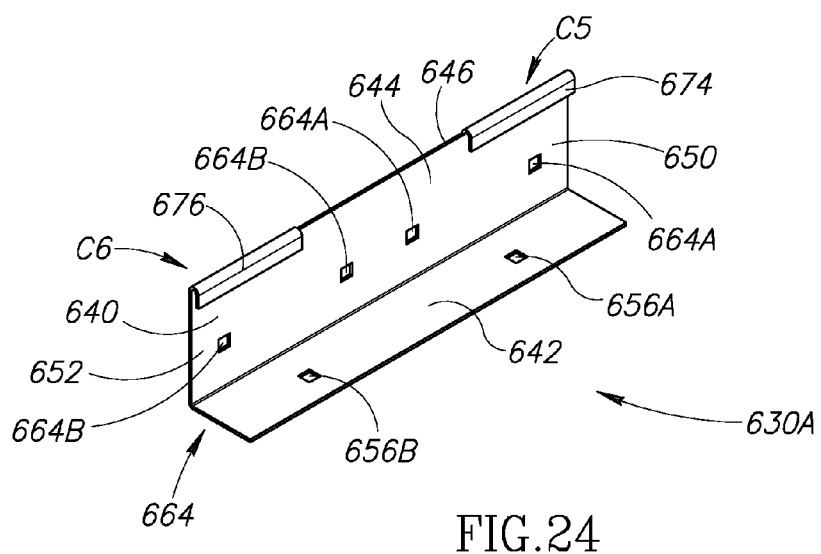
FIG. 24 is a perspective view of a splicing bracket.

The splicing bracket 630A may be substantially similar to the side bracket 506 (see FIG. 14) with the mounting portion 563 (see FIG. 14) omitted. Referring to FIG. 24, the splicing bracket 630A has an upright extending sidewall 640 connected to a flange 642. In the embodiment illustrated, the sidewall 640 is approximately orthogonal to the flange 642.

The sidewall 640 has an inwardly facing surface 644 opposite an outwardly facing surface 646, and a first end portion 650 opposite a second end portion 652. The flange 642 is substantially identical to the flange 562 (see FIG. 14) of the side bracket 506 (see FIG. 14). A through-hole 656A (substantially identical to the through-hole 566A formed in the flange 562 illustrated in FIG. 14) is formed in the flange 642 near the first end portion 650, and a through-hole 656B (substantially identical to the through-hole 566B formed in the flange 562 illustrated in FIG. 14) is formed in the flange 642 near the second end portion 652.

A plurality of through-holes 664 (substantially identical to the through-hole 564 formed in the sidewall 560 of the side bracket 506 illustrated in FIG. 14) are formed in the sidewall 640. The through-holes 664 include through-holes 664A formed near the first end portion 650, and through-holes 664B formed near the second end portion 652. The first end portion 650 has an upper most portion 674 that is folded over toward the inwardly facing surface 644 to form a fifth clip C5 (substantially identical to the third clip C3 illustrated in FIG. 18). The second end portion 652 has an upper most portion 676 that is folded over toward the inwardly facing surface 644 to form a sixth clip C6 (substantially identical to the fourth clip C4 illustrated in FIG. 18). The clips C5 and C6 are each configured to clip onto the sidewall 300 (see FIG. 6) of one of the peripheral frame members 200A-200F (see FIG. 6) in the same manner each of the clips C3 and C4 is configured to clip onto the sidewall 300. While the clips C5 and C6 have been illustrated as being discontinuous, in alternate embodiments, the clips C5 and C6 may each be end portions of a single continuous clip formed by folding over an upper most edge portion of the sidewall 640 toward the inwardly facing surface 644 of the sidewall 640.

Because the splice formed by the splicing bracket 630A is substantially identical to the splice formed by the splicing bracket 630B, only the splice formed by the splicing bracket 630A will be described in detail.

As shown in FIG. 20, the fifth clip C5 of the splicing bracket 630A is configured to clip onto the second mitered end 332 of the sidewall 300 of the peripheral frame member 200B and the sixth clip C6 is configured to clip onto the first mitered end 330 of the sidewall 300 of the peripheral frame member 200C. In the embodiment illustrated, the second mitered end 332 of the peripheral frame member 200B is slid into the fifth clip C5, and the first mitered end 330 of the peripheral frame member 200C is slid into the sixth clip C6. The through-holes 664A (see FIG. 24) are positioned to align with the through-holes 320B (see FIG. 6) formed in the sidewall 300 of the peripheral frame member 200B so that one or more of the optional fasteners 250 (e.g., the fasteners identified by the reference numerals 250N and 250O in FIG. 18) may extend therethrough to fasten together the splicing bracket 630A and the peripheral frame member 200B. The through-holes 664B (see FIG. 24) are positioned to align with the through-holes 320A (see FIG. 6) formed in the sidewall 300 of the peripheral frame member 200C so that one or more of the optional fasteners 250 (e.g., the fasteners identified by the reference numerals 250P and 250Q in FIG. 18) may extend therethrough to fasten together the splicing bracket 630A and the peripheral frame member 200C.

As mentioned above with respect to the side bracket 506 (see FIG. 18), the second mitered end 332 of the peripheral frame member 200B may be slid into the fifth clip C5, and the first mitered end 330 of the peripheral frame member 200C may be slid into the sixth clip C6 until the second mitered end 332 of the peripheral frame member 200B abuts the first mitered end 330 of the peripheral frame member 200C. When this occurs, the through-holes 664A (see FIG. 24) may be aligned or nearly aligned with the through-holes 320B (see FIG. 6), and the through-holes 664B (see FIG. 24) may be aligned or nearly aligned with the through-holes 320A (see FIG. 6). If necessary, the peripheral frame member 200B and/or the peripheral frame member 200C may be slid within the splicing bracket 630A to align the through-holes 664A with the through-holes 320B, and to align the through-holes 664B with the through-holes 320A. Then, the peripheral frame member 200B, the peripheral frame member 200C, and the splicing bracket 630A may be fastened together (e.g., using the optional fasteners 250).

Optionally, the through-hole 656A (see FIG. 24) formed in the flange 642 (see FIG. 24) may be aligned with the through-hole 322B (see FIG. 6) formed in the flange 302 (see FIG. 6) of the peripheral frame member 200B, and one of the optional fasteners 250 (e.g., the fastener identified by the reference numeral 250R in FIG. 18) may be inserted in the aligned through-holes to fasten the flange 642 to the flange 302 of the peripheral frame member 200B. Further, the through-hole 656B formed in the flange 642 (see FIG. 24) may be aligned with the through-hole 322A (see FIG. 6) formed in the flange 302 (see FIG. 6) of the peripheral frame member 200C, and one of the optional fasteners 250 (e.g., the fastener identified by the reference numeral 250S in FIG. 18) may be inserted in the aligned through-holes to fasten the flange 642 to the flange 302 of the peripheral frame member 200C.

As mentioned above, the peripheral frame members 200E and 200F are coupled together by the splicing bracket 630B. The fifth clip C5 of the splicing bracket 630B is configured to clip onto the second mitered end 332 of the sidewall 300 of the peripheral frame member 200E and the sixth clip C6 is configured to clip onto the first mitered end 330 of the sidewall 300 of the peripheral frame member 200F. Then, as explained above with respect to the splicing bracket 630A, the peripheral frame member 200E, the peripheral frame member 200F, and the splicing bracket 630B may be fastened together (e.g., using one or more of the optional fasteners 250).

Alternate Embodiment

Figure 21:
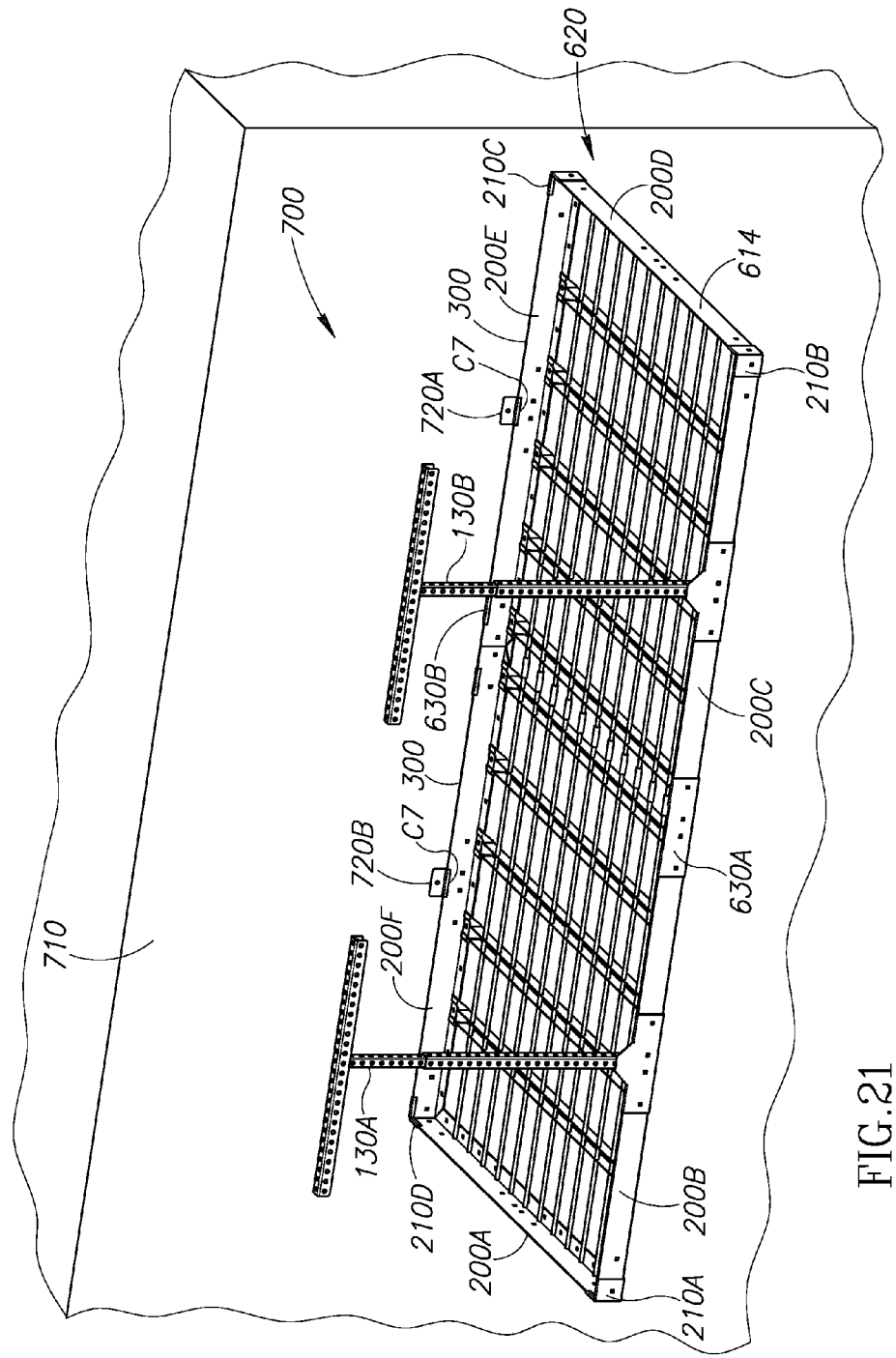
FIG. 21 is a perspective view of a third alternate embodiment of the storage rack.

In an alternate embodiment illustrated in FIG. 21, a storage rack 700 includes the platform assembly 620 and the support assemblies 130A and 130B. In this embodiment, the peripheral frame members 200E and 200F of the platform assembly 620 are coupled to and supported by a wall 710, instead of the support assemblies 130C and 130D. In the embodiment illustrated, the peripheral frame members 200E and 200F are coupled to the wall 710 by wall brackets 720A and 720B.

The wall brackets 720A and 720B are substantially identical to one another. For the sake of brevity, only the wall bracket 720A will be described in detail.

Figures 25, 26:
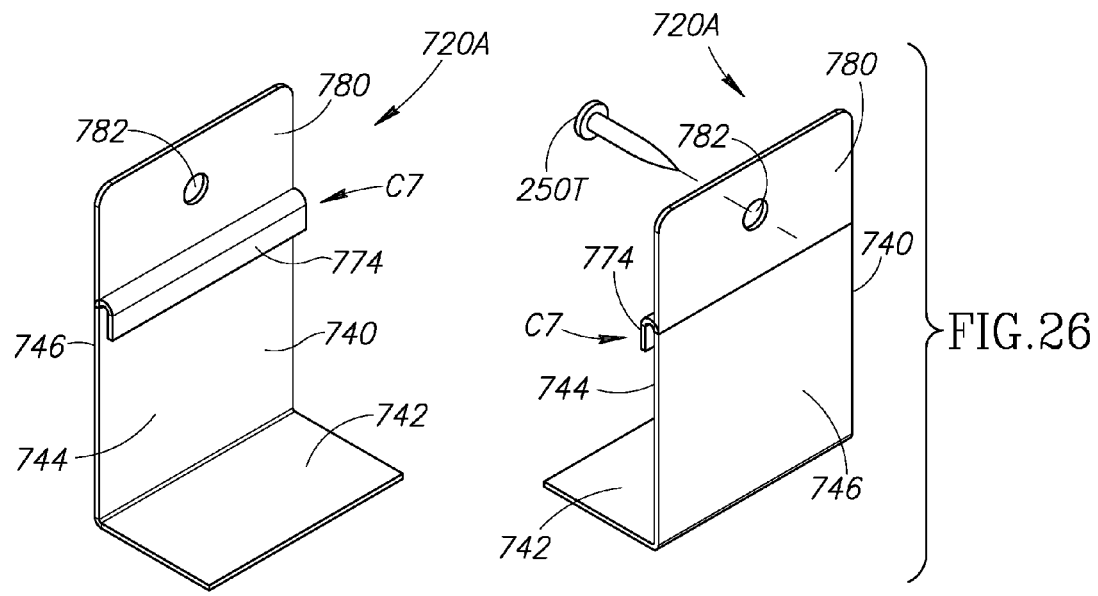
FIG. 25 is a perspective view of a wall bracket showing its inwardly facing surface.
FIG. 26 is a perspective view of the wall bracket of FIG. 25 showing its outwardly facing surface.

Referring to FIGS. 25 and 26, the wall bracket 720A has a generally L-shaped cross-sectional shape defined by an upright extending sidewall 740 connected to a laterally extending flange 742. In the embodiment illustrated, the sidewall 740 is approximately orthogonal to the flange 742.

The sidewall 740 has an inwardly facing surface 744 opposite an outwardly facing surface 746. The sidewall 740 has an upper portion 774 that is folded over toward the inwardly facing surface 744 to form a seventh clip C7 (substantially identical to the third or fourth clips C3 and C4 illustrated in FIG. 18). The seventh clip C7 is configured to clip onto the sidewall 300 (see FIG. 6) of one of the peripheral frame members 200A-200F (see FIG. 21) in the same manner as the third clip C3 (see FIG. 18) or the fourth clip C4 (see FIG. 18).

An anchor portion 780 is attached (e.g., welded) to the sidewall 740 near the seventh clip C7. In the embodiment illustrated, the anchor portion 780 is attached (e.g., welded) to the outwardly facing surface 746 of the sidewall 740 behind (or adjacent to) the seventh clip C7. In the embodiment illustrated, the anchor portion 780 is substantially planar and may be substantially coplanar with the sidewall 740. The anchor portion 780 includes at least one through-hole 782 configured to receive one of the optional fasteners 250 (identified by reference numeral 250T in FIG. 26).

As shown in FIG. 21, the seventh clip C7 of the wall bracket 720A may be clipped onto the sidewall 300 of the peripheral frame member 200E, and the seventh clip C7 of the wall bracket 720B may be clipped onto the sidewall 300 of the peripheral frame member 200F. In the embodiment illustrated, the sidewall 300 of the peripheral frame member 200E is slid into the seventh clip C7 of the wall bracket 720A, and the sidewall 300 of the peripheral frame member 200F is slid into the seventh clip C7 of the wall bracket 720B. Then, the wall brackets 720A and 720B may be positioned along the peripheral frame members 200E and 200F, respectively, at desired locations (e.g., approximately midway along the respective peripheral frame member). Then, one of the fasteners 250 (e.g., like the fastener 250T of FIG. 26) is inserted into each of the through-holes 782 formed in the anchor portions 780 of the wall brackets 720A and 720B and fastened to the wall 710 to thereby fasten the platform assembly 620 to the wall 710. Thus, in this embodiment, the wall brackets 720A and 720B, the wall 710, the support assemblies 130A and 130B, and one or more of the support structures 110A-110F (see FIG. 1A) provide support to the platform assembly 620.

Alternate Embodiment

Figure 22:
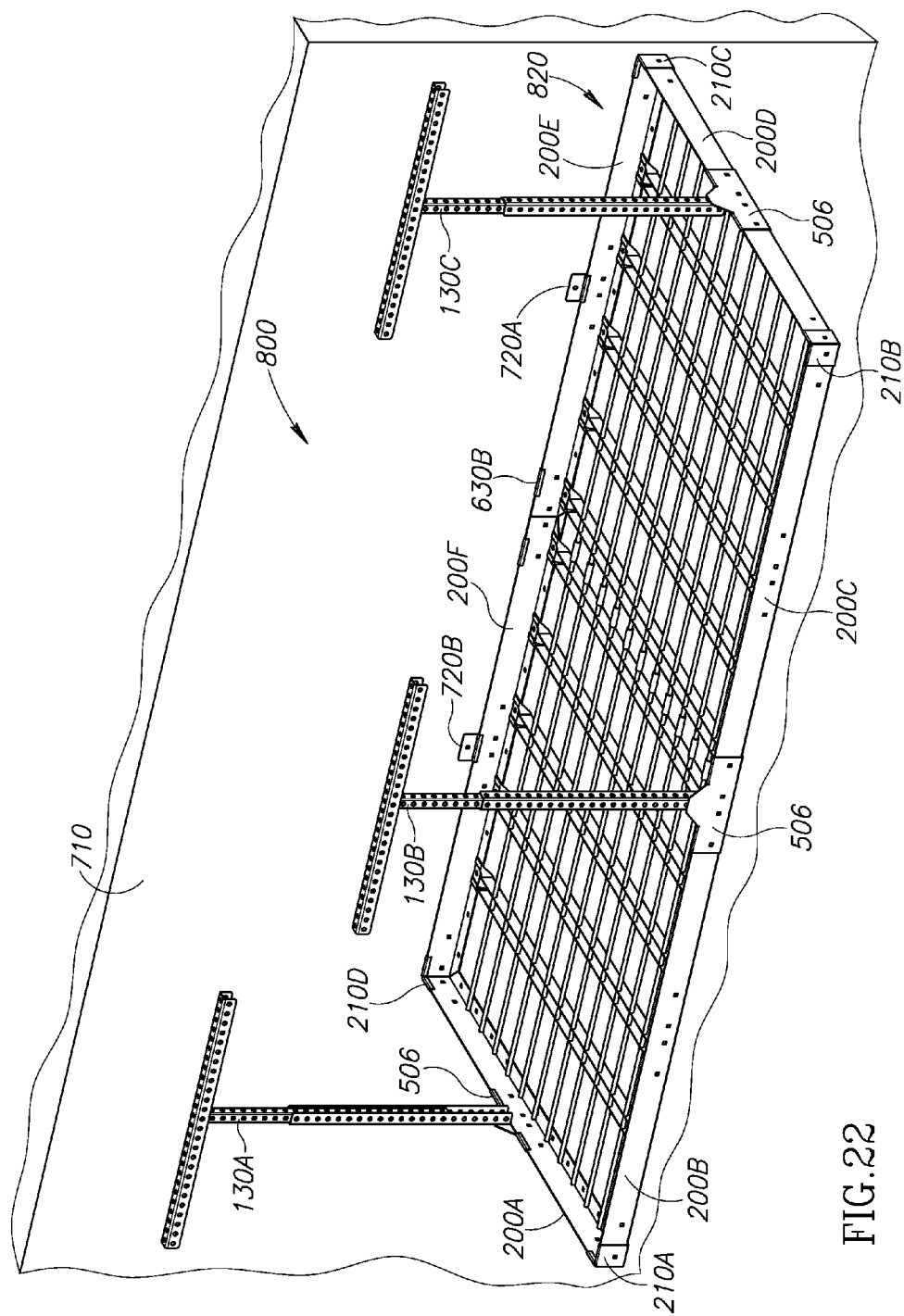
FIG. 22 is a perspective view of a fourth alternate embodiment of the storage rack.

In an alternate embodiment illustrated in FIG. 22, a storage rack 800 includes a platform assembly 820 substantially similar to the platform assembly 120 (see FIG. 5). However, in the platform assembly 820, the splicing bracket 630B is used to couple (or splice) the peripheral frame members 200E and 200F together instead of the support assembly 130D, which has been omitted from the storage rack 800.

The platform assembly 820 is mounted to the underside of one or more of the support structures 110A-110F (see FIG. 1A) by the support assemblies 130A-130C. The support assemblies 130A and 130C are coupled to the peripheral frame members 200A and 200D, respectively. Clipping the side bracket 506 of one of the support assemblies 130A-130D to a single one of the peripheral frame members 200A-200F has been described above and will not be repeated here. The support assembly 130B couples (or splices) the peripheral frame members 200B and 200C together. The peripheral frame members 200E and 200F are coupled to the wall 710 by the wall brackets 720A and 720B. Thus, in this embodiment, the wall brackets 720A and 720B, the wall 710, the support assemblies 130A-130C, and one or more of the support structures 110A-110F (see FIG. 1A) provide support to the platform assembly 820.

Alternate Embodiment

Figure 23:
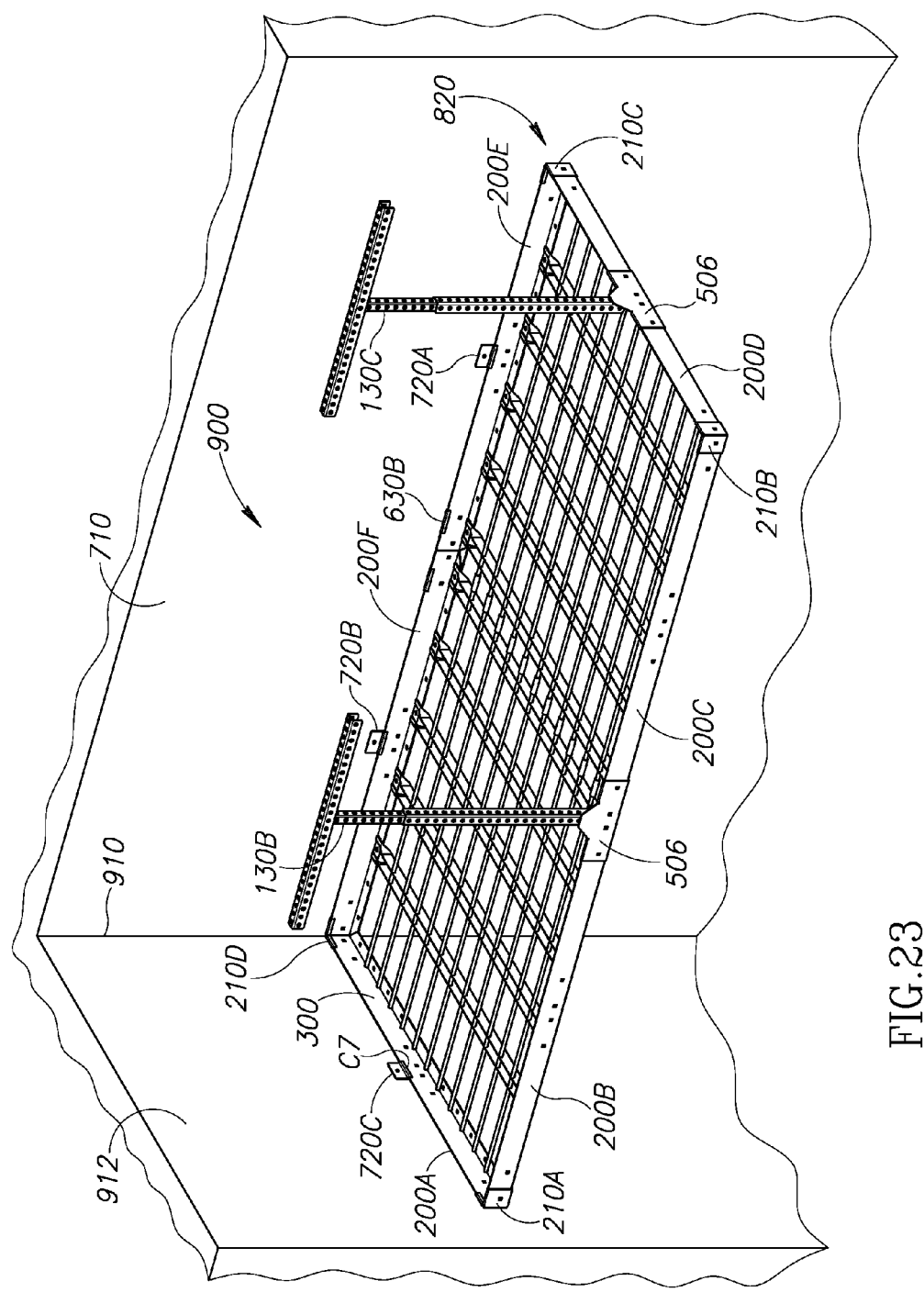
FIG. 23 is a perspective view of a fifth alternate embodiment of the storage rack.

In an alternate embodiment illustrated in FIG. 23, a storage rack 900 includes the platform assembly 820 and the support assemblies 130B and 130C. The storage rack 900 is positioned at a corner 910 formed by the first wall 710 and a second wall 912.

The platform assembly 820 is mounted to the underside of one or more of the support structures 110A-110F (see FIG. 1A) by the support assemblies 130B and 130C. The support assembly 130C is coupled to the peripheral frame members 200D. The support assembly 130B couples (or splices) the peripheral frame members 200B and 200C together. The wall brackets 720A and 720B couple the peripheral frame members 200E and 200F, respectively, to the first wall 710. Instead of being supported by the support assembly 130A, the peripheral frame member 200A of the platform assembly 620 is coupled to and supported by the second wall 912. The peripheral frame member 200A is coupled to the second wall 912 by a wall bracket 720C like the wall bracket 720A.

As shown in FIG. 23, the seventh clip C7 of the wall bracket 720C may be clipped onto the sidewall 300 of the peripheral frame member 200A. In the embodiment illustrated, the sidewall 300 of the peripheral frame member 200E is slid into the seventh clip C7 of the wall bracket 720C. Then, the wall bracket 720C may be positioned along the peripheral frame member 200A at a desired location (e.g., approximately midway along the peripheral frame member 200A). Then, one of the fasteners 250 (e.g., like the fastener 250T of FIG. 26) is inserted into each of the through-holes 782 formed in the anchor portion 780 of the wall bracket 720C and fastened to the second wall 912 to thereby fasten the platform assembly 820 to the second wall 912. Thus, in this embodiment, the wall brackets 720A-720C, the first and second walls 710 and 912, the support assemblies 130B and 130C, and one or more of the support structures 110A-110F (see FIG. 1A) provide support to the platform assembly 820.

While the storage racks 100, 600, 610, 700, 800, and 900 have been described above, those of ordinary skill in the art appreciate that the components described above may be combined to form additional storage rack configurations that have not been illustrated but are within the scope of the present teachings. Further, as the above examples illustrate, each of the storage racks 100, 600, 610, 700, 800, and 900 may be partially or fully disassembled and reconfigured. Additionally, each of the storage racks 100, 600, 610, 700, 800, and 900 may be disassembled into their component parts for shipping and/or storage.

Figure 27:
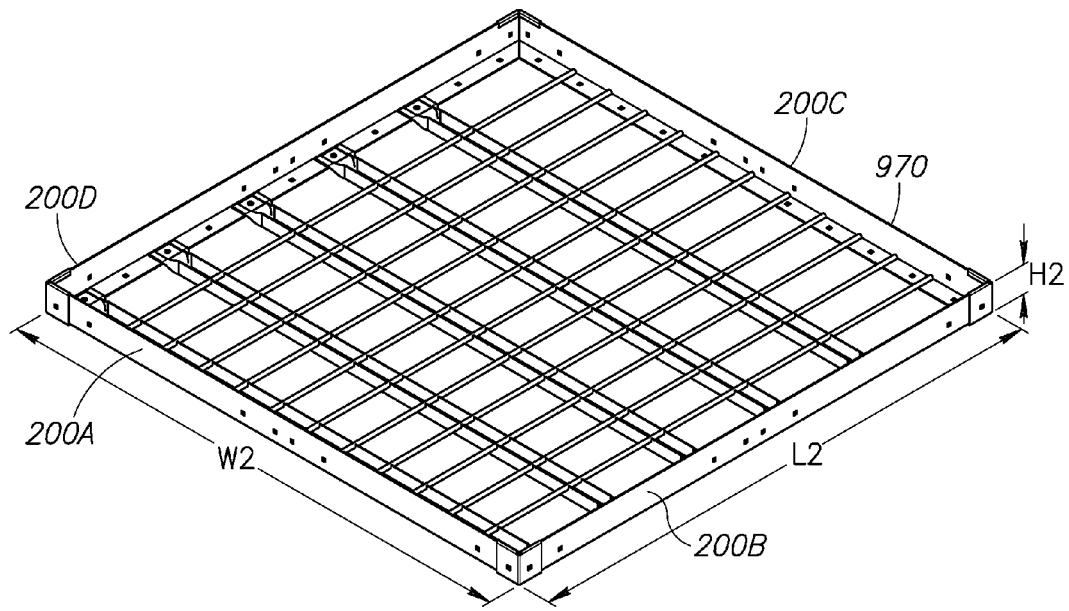
FIG. 27 is a perspective view of an exemplary platform assembly.
Figure 28:
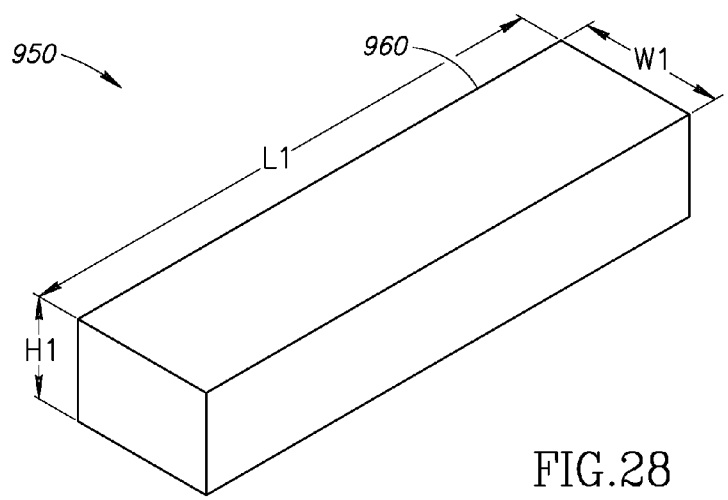
FIG. 28 is a perspective view of a kit.

Referring to FIG. 27, the component parts of each of the storage racks 100, 600, 610, 700, 800, and 900 may be included in a kit 950 (see FIG. 28). As shown in FIG. 28, the kit 950 may be packaged in a box 960 having a length L1, a width W1, and a height H1. The length L1 is greater than the width W1, and the width W1 is greater than or equal to the height H1. By way of non-limiting example, the length L1 may be three to four times greater than the width W1.

Referring to FIG. 27, when fully assembled, each of the storage racks 100, 600, 610, 700, 800, and 900 includes a peripheral frame (identified in FIG. 27 by reference numeral 970). While the dimensions of the peripheral frame 970 may vary depending upon how many peripheral frame members like the peripheral frame member 200A are used in its construction, the peripheral frame 970 nonetheless has a length L2, a width W2, and a height H2. The length L2 is greater than or equal to the width W2, and the width W2 is greater than the height H2. For ease of illustration, like the storage rack 600 (see FIG. 19), the peripheral frame 970 depicted in FIG. 27 includes only the four peripheral frame members 200A-200D.

Before the peripheral frame 970 is assembled, its component parts may be placed in the box 960 (see FIG. 28). Referring to FIG. 28, the length L1 of the box 960 may be substantially equal to or slight greater than the length L (see FIG. 6) of the longest of the peripheral frame members 200A-200D (see FIG. 27). Further, the width W1 of the box 960 may be significantly less than (e.g., less than half of) the width W2 of the peripheral frame 970 (see FIG. 27). Further, as illustrated, the width W1 of the box 960 may be significantly less than (e.g., less than half of) the length L (see FIG. 6) of the longest of the peripheral frame members 200A-200D (see FIG. 27). For example, the width W1 of the box 960 may be three to four times less than the length L (see FIG. 6) of the longest of the peripheral frame members 200A-200D (see FIG. 27). By way of a non-limiting example, the length L (see FIG. 6) of each of the peripheral frame members 200A-200D (see FIG. 27) may be about four feet and the width W1 of the box 960 may be about 13 inches. Further, as illustrated, the height H1 of the box is less than the width W1 of the box. By way of a non-limiting example, the length L1 may be about 49 inches, the width W1 may be about 12 inches, and the height H1 may range from about 4 inches to about 8 inches. Thus, the box 960 may have a smaller width (e.g., about 12 inches) than conventional boxes, which typically have a width that is about 25 inches or greater, used to package conventional storage racks.

When the kit 950 is configured to construct the storage rack 100, the kit 950 includes the following components, which may be stored and/or shipped in the box 960:

1. the peripheral frame members 200A-200F (see FIG. 5);
2. the corner braces 210A-210D (see FIG. 5);
3. the cross braces 220A-220J (see FIG. 5);
4. the poles 230A-230K (see FIG. 5);
5. four mounting brackets like the mounting brackets 500 (see FIGS. 11 and 12);
6. four upright supports like the upright support 502 (see FIGS. 11 and 12);
7. four subassemblies each including the upright member 504 coupled (e.g., welded) to the side bracket 506 (see FIGS. 11 and 12);
8. optionally, one or more of the tube-shaped pole couplers 240 (see FIGS. 3 and 5); and
9. optionally, the fasteners 250 (see FIG. 4).

When the kit 950 is configured to construct the storage rack 600 (see FIG. 19), the kit 950 includes the following components, which may be stored and/or shipped in the box 960:

1. the peripheral frame members 200A-200D (see FIG. 19);
2. the corner braces 210A-210D (see FIG. 19);
3. the cross braces 220A-220D (see FIG. 19);
4. the poles 230A-230K (see FIG. 19);
5. four mounting brackets like the mounting brackets 500 (see FIGS. 11 and 12);
6. four upright supports like the upright support 502 (see FIGS. 11 and 12);
7. four subassemblies each including the upright member 504 coupled (e.g., welded) to the side bracket 506 (see FIGS. 11 and 12); and
8. optionally, the fasteners 250 (see FIG. 4).

When the kit 950 is configured to construct the storage rack 610 (see FIG. 20), the kit 950 includes the following components, which may be stored and/or shipped in the box 960:

1. the peripheral frame members 200A-200F (see FIG. 20);
2. the corner braces 210A-210D (see FIG. 20);
3. the cross braces 220A-220J (see FIG. 5);
4. the poles 230A-230K (see FIG. 5);
5. four mounting brackets like the mounting brackets 500 (see FIGS. 11 and 12);
6. four upright supports like the upright support 502 (see FIGS. 11 and 12);
7. four subassemblies each including the upright member 504 coupled (e.g., welded) to the side bracket 506 (see FIGS. 11 and 12);
8. the splicing brackets 630A and 630B (see FIG. 20);
9. optionally, one or more of the tube-shaped pole couplers 240 (see FIGS. 3 and 5); and
10. optionally, the fasteners 250 (see FIG. 4).

When the kit 950 is configured to construct the storage rack 700 (see FIG. 21), the kit 950 includes the following components, which may be stored and/or shipped in the box 960:
1. the peripheral frame members 200A-200F (see FIG. 21);
2. the corner braces 210A-210D (see FIG. 21);
3. the cross braces 220A-220J (see FIG. 5);
4. the poles 230A-230K (see FIG. 5);
5. two mounting brackets like the mounting brackets 500 (see FIGS. 11 and 12);
6. two upright supports like the upright support 502 (see FIGS. 11 and 12);
7. two subassemblies each including the upright member 504 coupled (e.g., welded) to the side bracket 506 (see FIGS. 11 and 12);
8. the splicing brackets 630A and 630B (see FIG. 21);
9. the wall brackets 720A and 720B (see FIG. 21);
10. optionally, one or more of the tube-shaped pole couplers 240 (see FIGS. 3 and 5); and
11. optionally, the fasteners 250 (see FIG. 4).

When the kit 950 is configured to construct the storage rack 800 (see FIG. 22), the kit 950 includes the following components, which may be stored and/or shipped in the box 960:
1. the peripheral frame members 200A-200F (see FIG. 22);
2. the corner braces 210A-210D (see FIG. 22);
3. the cross braces 220A-220J (see FIG. 5);
4. the poles 230A-230K (see FIG. 5);
5. three mounting brackets like the mounting brackets 500 (see FIGS. 11 and 12);
6. three upright supports like the upright support 502 (see FIGS. 11 and 12);
7. three subassemblies each including the upright member 504 coupled (e.g., welded) to the side bracket 506 (see FIGS. 11 and 12);
8. the splicing bracket 630B (see FIG. 22);
9. the wall brackets 720A and 720B (see FIG. 22);
10. optionally, one or more of the tube-shaped pole couplers 240 (see FIGS. 3 and 5); and
11. optionally, the fasteners 250 (see FIG. 4).

When the kit 950 is configured to construct the storage rack 900 (see FIG. 23), the kit 950 includes the following components, which may be stored and/or shipped in the box 960:
1. the peripheral frame members 200A-200F (see FIG. 23);
2. the corner braces 210A-210D (see FIG. 23);
3. the cross braces 220A-220J (see FIG. 5);
4. the poles 230A-230K (see FIG. 5);
5. two mounting brackets like the mounting brackets 500 (see FIGS. 11 and 12);
6. two upright supports like the upright support 502 (see FIGS. 11 and 12);
7. two subassemblies each including the upright member 504 coupled (e.g., welded) to the side bracket 506 (see FIGS. 11 and 12);
8. the splicing bracket 630B (see FIG. 22);
9. the wall brackets 720A-720C (see FIG. 23);
10. optionally, one or more of the tube-shaped pole couplers 240 (see FIGS. 3 and 5); and
11. optionally, the fasteners 250 (see FIG. 4).

While embodiments of the kit 950 configured to construct each of the storage racks 100, 600, 610, 700, 800, and 900 have been described above, those of ordinary skill in the art appreciate that the kit 950 may be configured to construct additional storage rack configurations that have not been illustrated but are within the scope of the present teachings.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A storage rack comprising:
   a plurality of peripheral frame members configured to be assembled into a peripheral frame having a first side opposite a second side and a third side opposite a fourth side;
   a plurality of upright support assemblies mountable to the peripheral frame, the plurality of upright support assemblies extending upwardly from the peripheral frame when mounted thereto and being configured to mount the peripheral frame to one or more support structures located above the peripheral frame;
   a plurality of cross braces each including a plurality of notches; and
   a plurality of poles, wherein the peripheral frame, the plurality of cross braces, and the plurality of poles are configured to be assembled into a platform in which:
   (a) each of the plurality of cross braces is removably coupled to both the first and second sides and extends therebetween,
   (b) the plurality of notches of the plurality of cross braces are aligned with one another to form rows of aligned notches,
   (c) the rows are transverse to the plurality of cross braces, and
   (d) each of the plurality of poles is configured to be snapped into the notches of a different one of the rows, and, when snapped therein, to be supported between the third and fourth sides by only the plurality of cross braces.

2. The storage rack of claim 1, wherein
   the first side comprises a first one of the plurality peripheral frame members coupled to a second one of the plurality peripheral frame members by a first one of the plurality of upright support assemblies, and
   the second side comprises a third one of the plurality peripheral frame members coupled to a fourth one of the plurality peripheral frame members by a different second one of the plurality of upright support assemblies.

3. The storage rack of claim 2, wherein the first upright support assembly comprises a first bracket,
   the first bracket comprises a first clip clipped onto the first peripheral frame member, and a second clip clipped onto the second peripheral frame member,
   the second upright support assembly comprises a second bracket, and
   the second bracket comprises a third clip clipped onto the third peripheral frame member, and a fourth clip clipped onto the fourth peripheral frame member.

4. The storage rack of claim 2,
   wherein the third side comprises a single fifth one of the plurality peripheral frame members, a different third one of the plurality of upright support assemblies being mounted to the fifth peripheral frame member, and
   the fourth side comprises a single sixth one of the plurality peripheral frame members, a different fourth one of the plurality of upright support assemblies being mounted to the sixth peripheral frame member.

5. The storage rack of claim 1, further comprising:
   first, second, third, and fourth corner braces configured to couple selected ones of the plurality of peripheral frame members together within the peripheral frame, the first corner brace coupling together first and second ones of the plurality peripheral frame members, the second corner brace coupling together the second peripheral frame member and a third one of the plurality peripheral frame members, the third corner brace coupling together the third peripheral frame member and a fourth one of the plurality peripheral frame members, and the fourth corner brace coupling together the fourth and first peripheral frame members.

6. The storage rack of claim 1, wherein the peripheral frame comprises a plurality corners, and
   the plurality of upright support assemblies are mounted to the peripheral frame at other than the plurality corners.

7. The storage rack of claim 1, wherein each of the plurality of poles comprises a segment constructed from fiberglass.

8. The storage rack of claim 1, wherein the plurality of poles each comprise a first pole segment coupled to a second pole segment by a coupler.

9. The storage rack of claim 1, wherein
   the plurality of upright support assemblies comprises first, second, third, and fourth upright support assemblies,
   the first upright support assembly is coupled to the first side when the plurality of upright support assemblies are mounted to the peripheral frame,
   the second upright support assembly is coupled to the second side when the plurality of upright support assemblies are mounted to the peripheral frame,
   the third upright support assembly is coupled to the third side when the plurality of upright support assemblies are mounted to the peripheral frame,
   the fourth upright support assembly is coupled to the fourth side when the plurality of upright support assemblies are mounted to the peripheral frame,
   the first upright support assembly is juxtaposed with the second upright support assembly across the platform, and
   the third upright support assembly is juxtaposed with the fourth upright support assembly across the platform.

10. The storage rack of claim 1, wherein the platform has a central storage area, and
    the peripheral frame comprises an upwardly extending lip that extends substantially continuously around the central storage area.

11. The storage rack of claim 10, wherein the lip has a height of at least two inches.

12. The storage rack of claim 6, wherein the plurality of corners comprises a first corner,
    the plurality of peripheral frame members comprises first and second peripheral frame members positioned substantially orthogonally to one another, and
    the peripheral frame further comprises a corner brace positioned at the first corner, the corner brace comprising a first clip clipped onto the first peripheral frame member, and a second clip clipped onto the second peripheral frame member.

13. The storage rack of claim 12, wherein the first clip is slid into engagement with the first peripheral frame member, and
    the second clip is slid into engagement with the second peripheral frame member.

14. The storage rack of claim 1, wherein each of the plurality of upright support assemblies comprises a laterally extending mounting bracket and an upright support,
    the mounting bracket is mountable to at least one of the one or more support structures and comprises a first sidewall spaced part from a second sidewall, and
    the upright support comprises an end portion receivable between and couplable to the first and second sidewalls.

15. The storage rack of claim 14, wherein each of the plurality of upright support assemblies further comprises an upright member and a bracket,
    the upright member is configured to receive the upright support, the upright support is slidable along a sliding direction with respect to the upright member,
the upright support is couplable to the upright member at a selected location along the sliding direction,
the upright member is coupled to the bracket, and
the bracket is coupled to the peripheral frame.

16. The storage rack of claim 1, wherein
the plurality of upright support assemblies are mounted to the first side of the peripheral frame, and
the second side of the peripheral frame is mountable to a wall.

17. The storage rack of claim 16, further comprising:
at least one wall bracket configured to mount the second side of the peripheral frame to the wall.

18. The storage rack of claim 1, wherein
a first one of the plurality of upright support assemblies is mounted to the first side of the peripheral frame,
the second side of the peripheral frame is mountable to a first wall, and
the third side of the peripheral frame is mountable to a second wall.

19. A kit for constructing an overhead storage rack, the kit comprising:
a plurality of peripheral frame members;
a plurality of corner braces, when assembled together, the plurality of peripheral frame members and the plurality of corner braces at least partially forming a peripheral frame having a first side opposite a second side and a third side opposite a fourth side;
a mounting bracket configured to be mounted to the underside of a support structure;
a subassembly configured to be coupled to the mounting bracket, the subassembly comprising a side bracket couplable to at least one of the peripheral frame members;
a plurality of cross braces each including a plurality of notches; and
a plurality of pole segments wherein the peripheral frame, the plurality of cross braces, and the plurality of pole segments are configured to be assembled into a platform in which:
(a) each of the plurality of cross braces is removably coupled to both the first and second sides and extends therebetween,
(b) the plurality of notches of the plurality of cross braces are aligned with one another to form rows of aligned notches,
(c) the rows are transverse to the plurality of cross braces, and
(d) each of the plurality of pole segments is configured to be snapped into the notches of a different one of the rows, and, when snapped therein, to be supported between the third and fourth sides by only the plurality of cross braces.

20. The kit of claim 19, further comprising:
a box configured to store the plurality of peripheral frame members, the plurality of corner braces, the plurality of cross braces, the plurality of pole segments, the mounting bracket, and the subassembly, wherein
the box has a first length, a first width, and a first height,
the first length is three to four times greater than the first width,
the first width is greater than the first height,
the plurality of peripheral frame members comprises a longest peripheral frame member having a second length, and
the first width of the box is three to four times less than the second length of the longest peripheral frame member.

21. The kit of claim 19, further comprising:
an upright support configured to couple the subassembly to the mounting bracket.

22. The kit of claim 19, further comprising:
at least one splicing bracket configured to couple two of the peripheral frame members together within the peripheral frame.

23. The kit of claim 19, further comprising:
at least one wall bracket configured to couple one of the peripheral frame members to a wall.

24. The kit of claim 19, further comprising:
a box configured to store the plurality of peripheral frame members, the plurality of corner braces, the plurality of cross braces, the plurality of pole segments, the mounting bracket, and the subassembly, the assembled platform being too large to fit within the box.

\* \* \* \* \*